United States Patent
Yang et al.

(10) Patent No.: US 12,438,636 B1
(45) Date of Patent: Oct. 7, 2025

(54) DYNAMIC FROZEN POLAR CODES FOR PROBABILISTIC SHAPING

(71) Applicant: QUALCOMM Incorporated, San Diego, CA (US)

(72) Inventors: Wei Yang, San Diego, CA (US); Kirill Ivanov, La Jolla, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/611,018

(22) Filed: Mar. 20, 2024

(51) Int. Cl.
  *H04L 1/00* (2006.01)
  *H03M 13/00* (2006.01)
  *H03M 13/11* (2006.01)
  *H03M 13/13* (2006.01)

(52) U.S. Cl.
  CPC .......... *H04L 1/0042* (2013.01); *H04L 1/0061* (2013.01)

(58) Field of Classification Search
  CPC ............... H04L 1/0042; H04L 1/0061; H03M 13/1148; H03M 13/13; H03M 13/251; H03M 13/616
  See application file for complete search history.

(56) References Cited

U.S. PATENT DOCUMENTS

| | | | |
|---|---|---|---|
| 10,346,465 B2 * | 7/2019 | Gao | G06F 3/0488 |
| 11,108,411 B2 * | 8/2021 | Prinz | H03M 13/1148 |
| 11,632,193 B2 * | 4/2023 | Xu | H04L 1/0061 |
| | | | 714/758 |
| 2020/0220654 A1 | 7/2020 | Jang et al. | |
| 2024/0405787 A1 * | 12/2024 | Wan | H03M 13/235 |

OTHER PUBLICATIONS

International Search Report and Written Opinion—PCT/US2020/015522—ISA/EPO—May 20, 2025.
Iscan O., et al., "Probabilistic Shaping using 5G New Radio Polar Codes", IEEE Access, vol. 7, Feb. 7, 2019, pp. 22579-22587, XP011712112, pp. 1-9, section V.
Iscan O., et al., "Probabilistically Shaped Multi-Level Coding with Polar Codes for Fading Channels", IEEE Globecom Workshops (GC WKSHPS), Dec. 9, 2018, 5 Pages, XP033519091, section IV.

* cited by examiner

*Primary Examiner* — Justin R Knapp
(74) *Attorney, Agent, or Firm* — Procopio, Cory, Hargreaves & Savitch LLP

(57) ABSTRACT

Dynamic frozen polar codes for probabilistic shaping are described. An apparatus is configured to map transmission bits to an EC-polar code. The transmission bits include first data bits, second data bits, EC bits, and shaping bits. The first data bits correspond to frozen bit locations of the EC-polar code, the shaping bits correspond to information bit locations of the EC-polar code, and the EC bits and the second bits both correspond to remaining locations of the EC-polar code. The apparatus is configured to shape the transmission bits to shaped transmission bits based on the mapping, the EC-polar code, and an addition operation on the transmission bits including the EC bits and the second data bits. The apparatus is configured to transmit, to a receiver network device, the shaped transmission bits.

20 Claims, 16 Drawing Sheets

DYNAMIC FROZEN POLAR CODES FOR PROBABILISTIC SHAPING

TECHNICAL FIELD

The present disclosure relates generally to communication systems, and more particularly, to wireless communications utilizing polar codes.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus is configured to map a set of transmission bits to an error check polar code (EC-polar code). The set of transmission bits includes a first set of data bits, a second set of data bits, a set of error checking (EC) bits, and a set of shaping bits, where the first set of data bits corresponds to a set of frozen bit locations of the EC-polar code, the set of shaping bits corresponds to a set of information bit locations of the EC-polar code, and the set of EC bits and the second set of data bits both correspond to a set of remaining locations of the EC-polar code. The apparatus is configured to shape the set of transmission bits to a set of shaped transmission bits based on the mapping, the EC-polar code, and an addition operation on the set of transmission bits including the set of EC bits and the second set of data bits. The apparatus is configured to transmit, to a receiver network device, the set of shaped transmission bits.

In the aspect, the method includes mapping a set of transmission bits to an EC-polar code. The set of transmission bits includes a first set of data bits, a second set of data bits, a set of EC bits, and a set of shaping bits, where the first set of data bits corresponds to a set of frozen bit locations of the EC-polar code, the set of shaping bits corresponds to a set of information bit locations of the EC-polar code, and the set of EC bits and the second set of data bits both correspond to a set of remaining locations of the EC-polar code. The method includes shaping the set of transmission bits to a set of shaped transmission bits based on the mapping, the EC-polar code, and an addition operation on the set of transmission bits including the set of EC bits and the second set of data bits. The method includes transmitting, to a receiver network device, the set of shaped transmission bits.

In another aspect of the disclosure, a method, a computer-readable medium, and an apparatus are provided. The apparatus is configured to receive, from a transmitter network device, a set of shaped transmission bits associated with an EC-polar code. The apparatus is configured to de-shape the set of shaped transmission bits to a set of transmission bits based on: (i) an inverse of the EC-polar code for a first set of data bits, a set of shaping bits, and a combination of a set of EC bits with a second set of data bits of the set of transmission bits, (ii) the set of shaping bits for the set of EC bits of the set of transmission bits, and (iii) a subtraction of the set of EC bits from the combination of the set of EC bits with the second set of data bits for the second set of data bits of the set of transmission bits.

In the aspect, the method includes receiving, from a transmitter network device, a set of shaped transmission bits associated with an EC-polar code. The method includes de-shaping the set of shaped transmission bits to a set of transmission bits based on: (i) an inverse of the EC-polar code for a first set of data bits, a set of shaping bits, and a combination of a set of EC bits with a second set of data bits of the set of transmission bits, (ii) the set of shaping bits for the set of EC bits of the set of transmission bits, and (iii) a subtraction of the set of EC bits from the combination of the set of EC bits with the second set of data bits for the second set of data bits of the set of transmission bits.

In another aspect of the disclosure, a method, a computer-readable medium, and an apparatus are provided. The apparatus is configured to process a set of bits based on a polar code, where the polar code is associated with a pre-transformed polar code, where the set of bits is associated with a mapping, to the polar code, that includes (i) a superset of data bits comprising a set of data bits at a set of frozen bit locations of the polar code and zeros at a set of information bit locations of the polar code and (ii) a set of transformed shaping bits associated with an application of a pre-transform matrix to a set of shaping bits at the set of information bit locations and zeros at the set of frozen bit locations, where the set of transformed shaping bits is super-imposed with the superset of data bits. The apparatus is configured to communicate, with a second network device, a set of shaped transmission bits associated with the set of bits prior to or subsequent to the set of bits being processed based on the polar code.

In the aspect, the method includes processing a set of bits based on a polar code, where the polar code is associated with a pre-transformed polar code, where the set of bits is associated with a mapping, to the polar code, that includes (i) a superset of data bits comprising a set of data bits at a set of frozen bit locations of the polar code and zeros at a set of information bit locations of the polar code and (ii) a set of transformed shaping bits associated with an application of pre-transform matrix to a set of shaping bits at the set of information bit locations and zeros at the set of frozen bit locations, where the set of transformed shaping bits is super-imposed with the superset of data bits. The method includes communicating, with a second network device, a set of shaped transmission bits associated with the set of bits prior to or subsequent to processing the set of bits based on the polar code.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
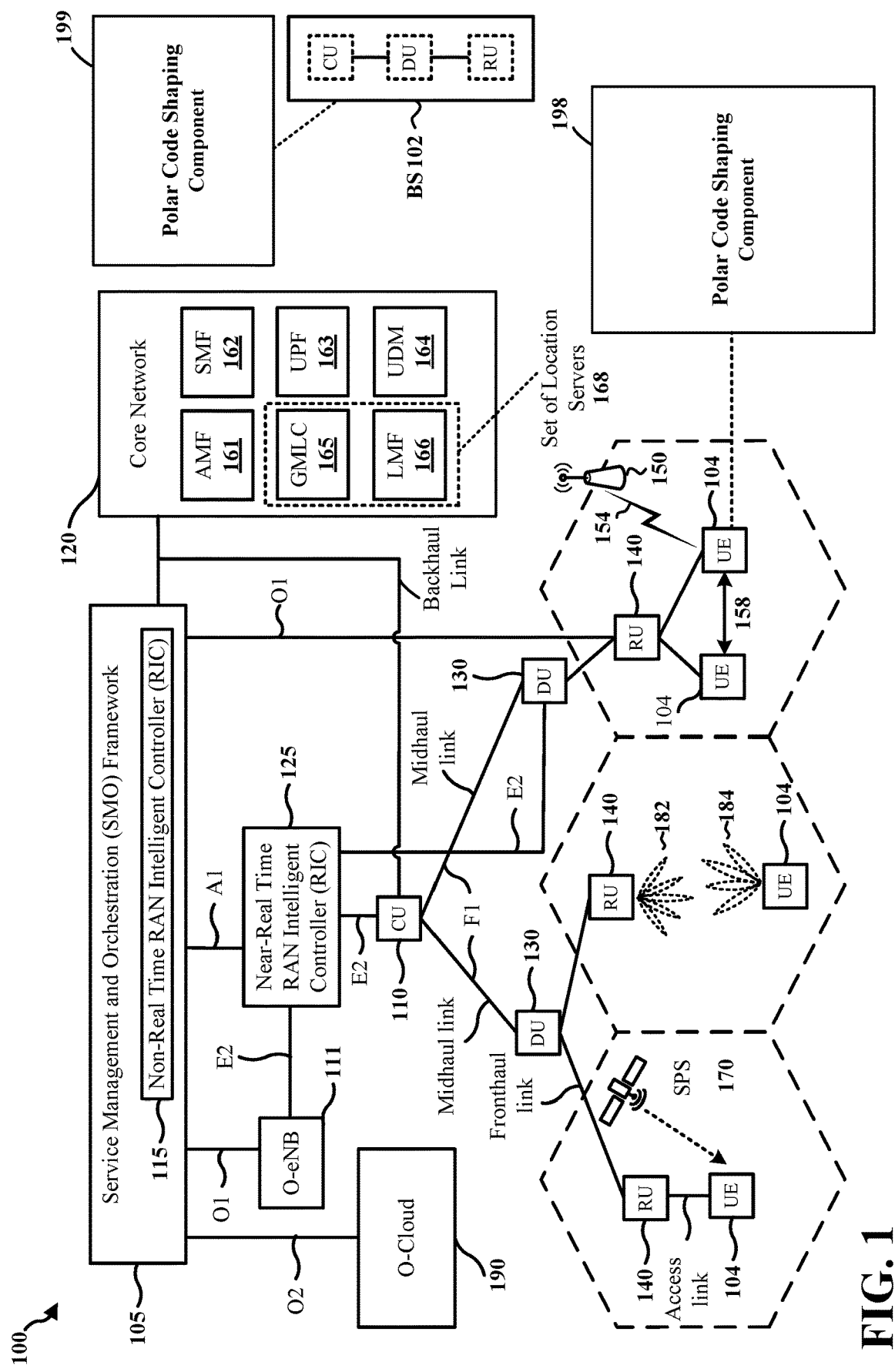
FIG. 1 is a diagram illustrating an example of a wireless communications system and an access network.

Wireless communication networks, such as a 5G NR network, among other examples of wireless communication networks, may be designed to support communications between network nodes (e.g., base stations, gNBs, etc.) and UEs, or transmitter network devices and receiver network devices, generally, that utilize polar codes for channel polarization of communication payloads. A communication channel may converge to either of a useless or a noiseless channel based on application of a polar transform. Polar code design may include determining which bit locations are allocated to send information bits and which bit locations to send frozen bits. For a polar code, a cyclic redundancy check (CRC) may be used to improve the decoding performance for channel coding. Dynamic frozen polar codes (also known as pre-transformed polar codes or parity check (PC) polar codes) are another set of approaches to improve polar code performance for channel coding.

However, using CRC-polar does not improve shaping performance, and actually may make the shaping performance worse than a plain/standard polar code. As an example, for shaping, the use of a codeword that yields the best energy savings may be sought, yet there is no "correct" codeword being transmitted. Thus, using a CRC check to select the polar codeword in list decoding does not provide a solution to improve shaping performance. Similarly, a direct application of a PC polar code to the shaping problem does not yield an improvement for shaping performance. As an example of the differences between shaping and channel coding, it may be observed for the channel coding problem that the frozen bits of polar codes can be in principle set to any value as long as the receiver side knows the value or the rules in which these "dynamic" frozen bits are generated. Yet in the context of the shaping problem, the frozen bits may have a correspondence to be the raw data bits to be transmitted in order for the receiver side to recover the data after de-shaping. Therefore, any dynamic frozen/PC bits may be placed into the subset of bit locations that were designed as "information bit locations" for polar codes and not placed into other locations. As a consequence, PC/dynamic frozen polar codes do not provide any additional gain for shaping compared to plain polar codes.

Various aspects relate generally to wireless communications utilizing polar codes. Some aspects more specifically relate to dynamic frozen polar codes for probabilistic shaping. In one example, a transmitter network device (e.g., a UE or a network node/entity), may map a set of transmission bits to an EC-polar code. The set of transmission bits may include a first set of data bits, a second set of data bits, a set of error checking (EC) bits, and a set of shaping bits. The first set of data bits may correspond to a set of frozen bit locations of the EC-polar code. The set of shaping bits may correspond to a set of information bit locations of the EC-polar code. The set of EC bits and the second set of data bits may both correspond to a set of remaining locations of the EC-polar code. The transmitter network device may shape the set of transmission bits to a set of shaped transmission bits based on the mapping, the EC-polar code, and an addition operation on the set of transmission bits including the set of EC bits and the second set of data bits. The transmitter network device may transmit, to a receiver network device (e.g., the network node/entity or the UE), the set of shaped transmission bits. In one example, a receiver network device (e.g., a UE or a network node/entity), may receive, from a transmitter network device (e.g., the network node/entity or the UE), a set of shaped transmission bits associated with an EC-polar code. The receiver network device may de-shape the set of shaped transmission bits to a set of transmission bits. The de-shaping may be based on: (i) an inverse of the EC-polar code for a first set of data bits, a set of shaping bits, and a combination of a set of EC bits with a second set of data bits of the set of transmission bits, (ii) the set of shaping bits for the set of EC bits of the set of transmission bits, and (iii) a subtraction of the set of EC bits from the combination of the set of EC bits with the second set of data bits for the second set of data bits of the set of transmission bits. In one example, a first network device (e.g., a transmitter network device or a receiver network device) may process a set of bits based on a polar code. The polar code may be associated with a PAC code and/or a pre-transformed polar code. The set of bits may be associated with a mapping, to the polar code, that includes (i) a superset of data bits comprising a set of data bits at a set of frozen bit locations of the polar code and zeros at a set of information bit locations of the polar code and (ii) a set of transformed shaping bits associated with an application of an upper-triangular matrix to a set of shaping bits at the set of information bit locations and zeros at the set of frozen bit locations. The upper-triangular matrix may include diagonal elements equal to one and the set of transformed shaping bits may be super-imposed with the superset of data bits. The first network device may communicate, with a second network device (e.g., the network node/entity or the UE), a set of shaped transmission bits associated with the set of bits prior to or subsequent to processing the set of bits based on the polar code.

Particular aspects of the subject matter described in this disclosure can be implemented to realize one or more of the following potential advantages. In some examples, by mapping bit of a data payload to be transformed by an EC-polar code using a super-position or add/XOR of a set of data bits of the payload with EC bits, the described techniques can be used to maximize shaping with $2^k$ codewords (where k is the number of shaping bits) as in other polar code solutions, while improving/increasing the minimum distance between the codewords over other polar code solutions.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a polar code shaping component 198 ("component 198") that may be configured to map a set of transmission bits to an EC-polar code. The set of transmission bits includes a first set of data bits, a second set of data bits, a set of EC bits, and a set of shaping bits, where the first set of data bits corresponds to a set of frozen bit locations of the EC-polar code, the set of shaping bits corresponds to a set of information bit locations of the EC-polar code, and the set of EC bits and the second set of data bits both correspond to a set of remaining locations of the EC-polar code. The component 198 may be configured to shape the set of transmission bits to a set of shaped transmission bits based on the mapping, the EC-polar code, and an addition operation on the set of transmission bits including the set of EC bits and the second set of data bits. The component 198 may be configured to transmit, to a receiver network device, the set of shaped transmission bits. The component 198 may be configured to receive, from a transmitter network device, a set of shaped transmission bits associated with an EC-polar code. The component 198 may be configured to de-shape the set of shaped transmission bits to a set of transmission bits based on: (i) an inverse of the EC-polar code for a first set of data bits, a set of shaping bits, and a combination of a set of EC bits with a second set of data bits of the set of transmission bits, (ii) the set of shaping bits for the set of EC bits of the set of transmission bits, and (iii) a subtraction of the set of EC bits from the combination of the set of EC bits with the second set of data bits for the second set of data bits of the set of transmission bits. The component 198 may be configured to process a set of bits based on a polar code, where the polar code is associated with a pre-transformed polar code, where the set of bits is associated with a mapping, to the polar code, that includes (i) a superset of data bits comprising a set of data bits at a set of frozen bit locations of the polar code and zeros at a set of information bit locations of the polar code and (ii) a set of transformed shaping bits associated with an application of a pre-transform matrix to a set of shaping bits at the set of information bit locations and zeros at the set of frozen bit locations, where the set of transformed shaping bits is super-imposed with the superset of data bits. The component 198 may be configured to communicate, with a second network device, a set of shaped transmission bits associated with the set of bits prior to or subsequent to the set of bits being processed based on the polar code.

In certain aspects, the base station 102 may have a polar code shaping component 199 ("component 199") that may be configured to map a set of transmission bits to an EC-polar code. The set of transmission bits includes a first set of data bits, a second set of data bits, a set of EC bits, and a set of shaping bits, where the first set of data bits corresponds to a set of frozen bit locations of the EC-polar code, the set of shaping bits corresponds to a set of information bit locations of the EC-polar code, and the set of EC bits and the second set of data bits both correspond to a set of remaining locations of the EC-polar code. The component 199 may be configured to shape the set of transmission bits to a set of shaped transmission bits based on the mapping, the EC-polar code, and an addition operation on the set of transmission bits including the set of EC bits and the second set of data bits. The component 199 may be configured to transmit, to a receiver network device, the set of shaped transmission bits. The component 199 may be configured to receive, from a transmitter network device, a set of shaped transmission bits associated with an EC-polar code. The component 199 may be configured to de-shape the set of shaped transmission bits to a set of transmission bits based on: (i) an inverse of the EC-polar code for a first set of data bits, a set of shaping bits, and a combination of a set of EC bits with a second set of data bits of the set of transmission bits, (ii) the set of shaping bits for the set of EC bits of the set of transmission bits, and (iii) a subtraction of the set of EC bits from the combination of the set of EC bits with the second set of data bits for the second set of data bits of the set of transmission bits. The component 199 may be configured to process a set of bits based on a polar code, where the polar code is associated with a pre-transformed polar code, where the set of bits is associated with a mapping, to the polar code, that includes (i) a superset of data bits comprising a set of data bits at a set of frozen bit locations of the polar code and zeros at a set of information bit locations of the polar code and (ii) a set of transformed shaping bits associated with an application of a pre-transform matrix to a set of shaping bits at the set of information bit locations and zeros at the set of frozen bit locations, where the set of transformed shaping bits is super-imposed with the superset of data bits. The component 199 may be configured to communicate, with a second network device, a set of shaped transmission bits associated with the set of bits prior to or subsequent to the set of bits being processed based on the polar code.

Accordingly, aspects provide for maximizing shaping with $2^k$ codewords (where k is the number of shaping bits) as in other polar code solutions, while improving/increasing the minimum distance between the codewords over other polar code solutions by mapping bit of a data payload to be transformed by an EC-polar code using a super-position or add/XOR of a set of data bits of the payload with EC bits.

Figure 2:
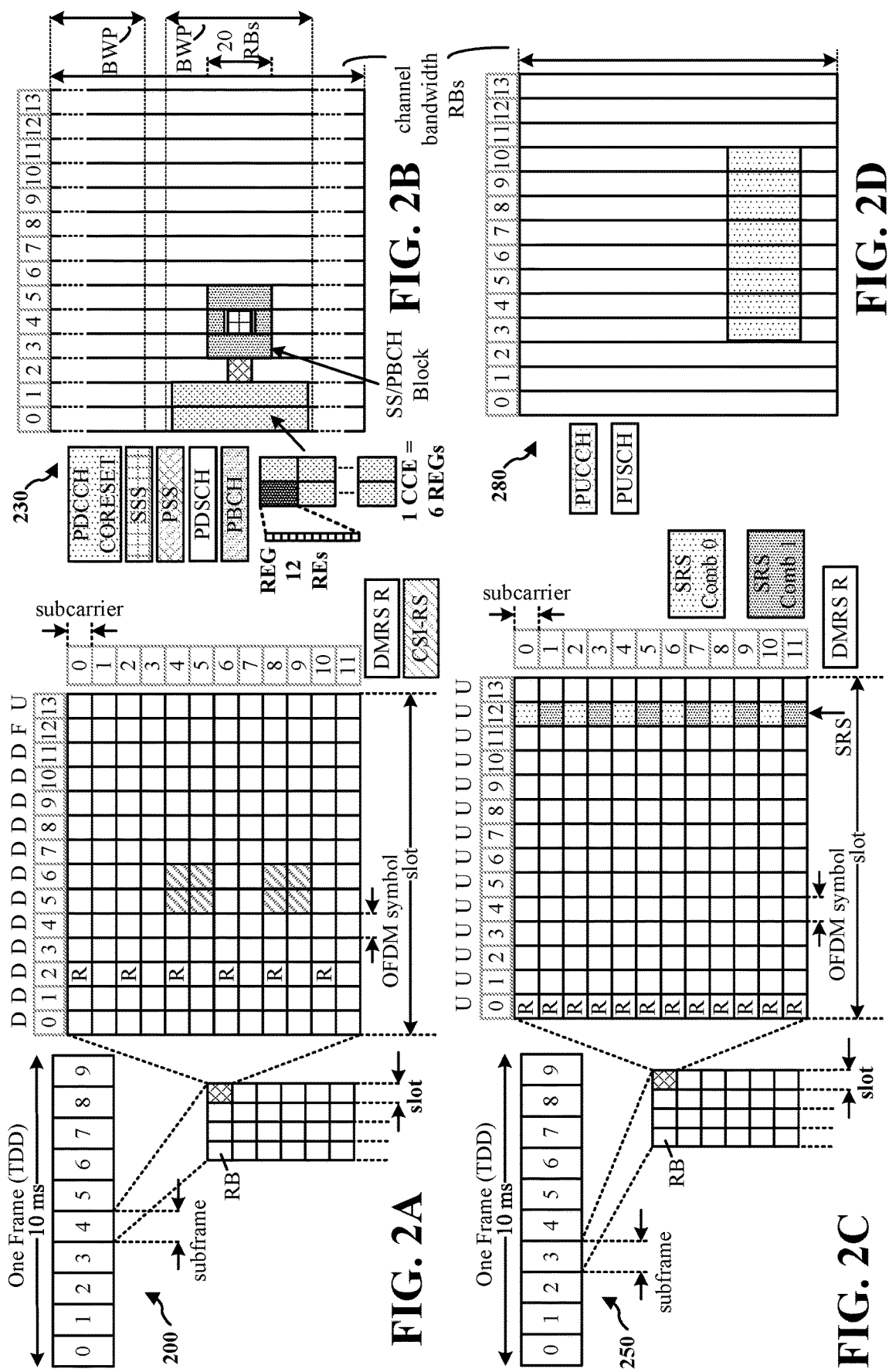
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
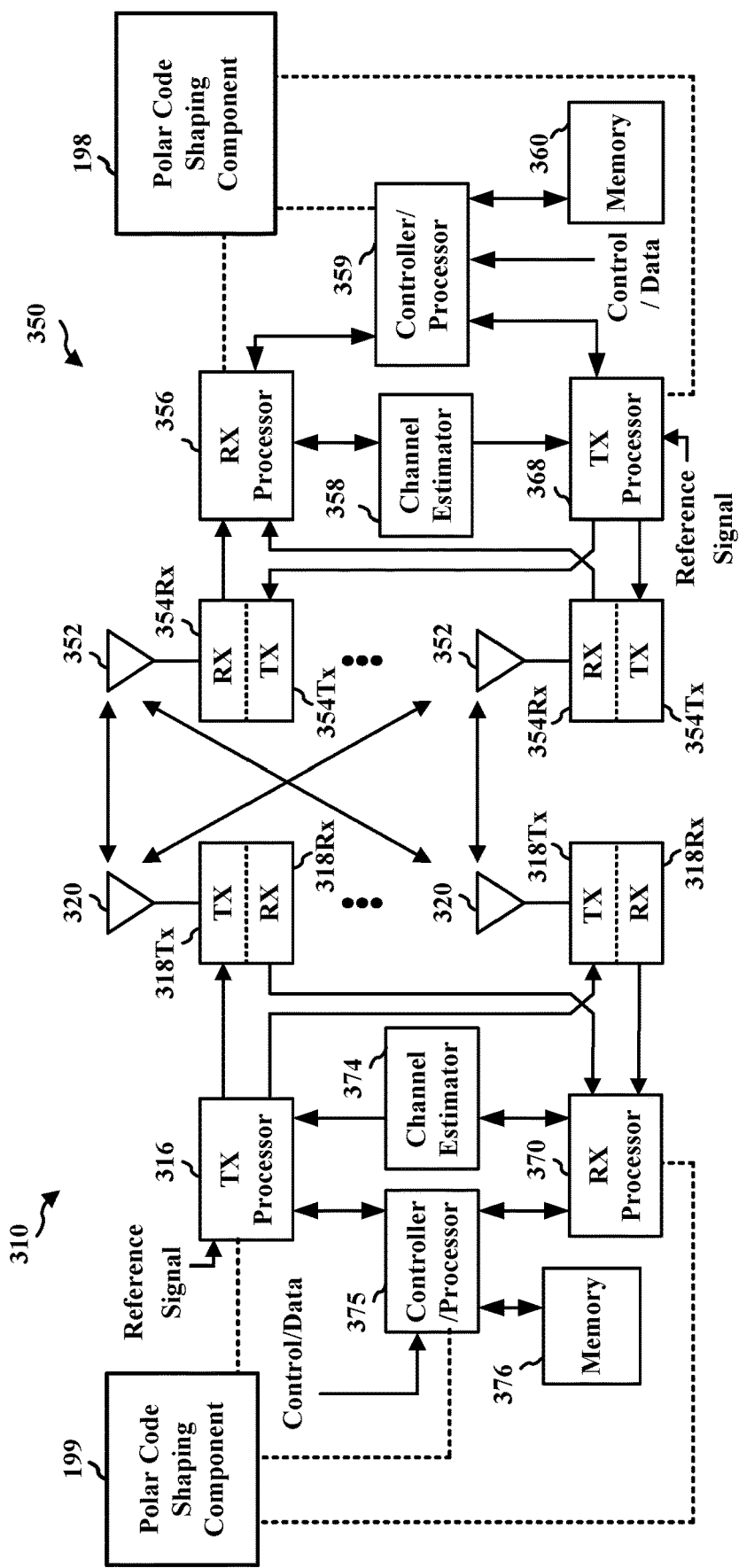
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the component 198 of FIG. 1.

At least one of the TX processor 316, the RX processor 370, and the controller/processor 375 may be configured to perform aspects in connection with the component 199 of FIG. 1.

Communications between network nodes/entities (e.g., base stations, gNBs, etc.) and UEs, or transmitter network devices and receiver network devices, generally, may utilize polar codes for channel polarization of communication payloads. A communication channel may converge to either of a useless or a noiseless channel based on application of a polar transform. Polar code design may include determining which bit locations are allocated to send information bits and which bit locations to send frozen bits. For a polar code, a CRC may be used to improve the decoding performance for channel coding. Dynamic frozen polar codes (also known as pre-transformed polar codes/PC-polar codes are another set of approaches to improve polar code performance for channel coding. However, using CRC-polar does not improve shaping performance, and in some cases may make the shaping performance worse than a plain/standard polar code. As an example, for shaping, the use of a codeword that yields the best energy savings may be sought, yet there is no "correct" codeword being transmitted. Thus, using a CRC check to select the polar codeword in list decoding does not provide a solution to improve shaping performance. Similarly, a direct application of a PC polar code to the shaping problem does not yield an improvement for shaping performance. As an example, for the channel coding problem, the frozen bits of polar codes can be in principle set to any value as long as the receiver side knows the value or the rules in which these "dynamic" frozen bits are generated. Yet in the context of the shaping problem, the frozen bits may have a correspondence to be the raw data bits to be transmitted in order for the receiver side to recover the data after de-shaping. Therefore, any dynamic frozen/PC bits may be placed into the subset of bit locations that were designed as "information bit locations" for polar codes and not placed into other locations. As a consequence, PC/dynamic frozen polar codes do not provide any additional gain for shaping compared to plain polar codes.

Figure 4:
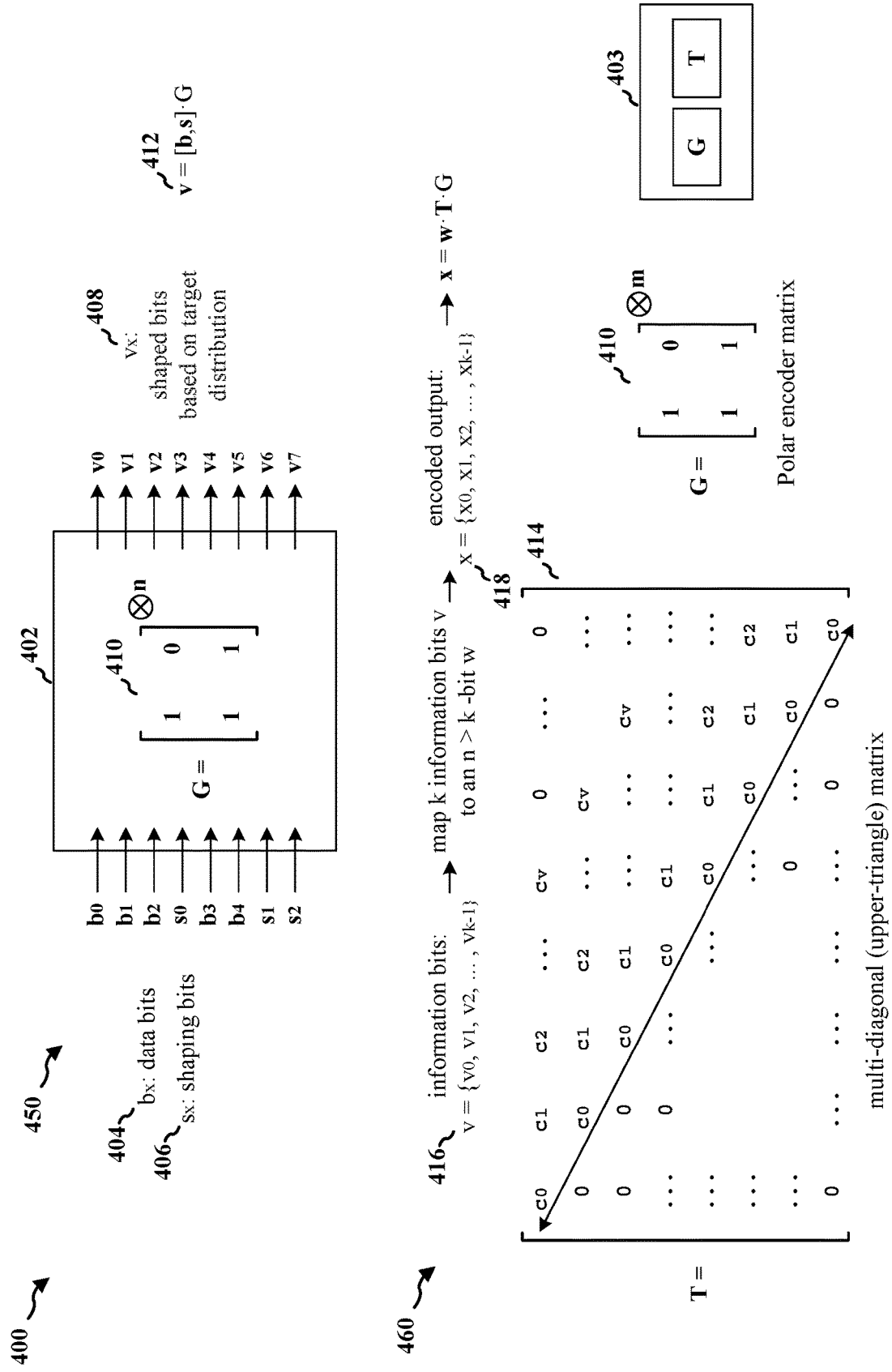
FIG. 4 is a diagram illustrating examples of polar codes for shaping.

FIG. 4 is a diagram 400 illustrating examples of polar codes for shaping. Diagram 400 shows a configuration 450 for a polar code 402 and associated encoder matrix (G), a polar encoder matrix 410, and a configuration 460 for a PAC code/pre-transformed polar code, a polar code 403, and associated encoder matrix (G) and multi-diagonal matrix (T), the polar encoder matrix 410 and a multi-diagonal matrix 414.

In the configuration 450, data bits 404 and shaping bits 406 are input into the polar code 402 and transformed by the polar encoder matrix 410, shown as $$G = \begin{bmatrix} 1 & 0 \\ 1 & 1 \end{bmatrix}^{\otimes m},$$

to generate, as output, shaped bits 408. Generally, a polar code for shaping may place the raw information bits on the frozen bit locations of the polar code, and use a polar decoder at the transmitter (Tx) side to decode a set of shaping bits (e.g., the shaping bits 406), such that the codeword 412 (v=[b,s]*G) resulting after polar encoding has the desired (e.g., non-uniform) distribution. On the Tx side, the polar code 402 uses a polar decoder to perform shaping. First a log likelihood ratio (LLR) is initialized according to the target distribution:

$$LLR = \log \frac{Pr(v=0)}{Pr(v=1)},$$

then the decoder utilizes the raw information bits as frozen bits, and attempts to decode the corresponding shaping bits, e.g., the shaping bits 406. The Tx side next re-encodes using the codeword 412 (v=[b,s]*G), and transmits the codeword 412 'v' to the receiver (Rx) side.

For the Rx side, operations include receiving the correct codeword 'v', e.g., the codeword 412, such as after channel decoding, which could be performed by any FEC codes), and then performing the operation of applying the polar encoder matrix 410 to the codeword 412: (v*G). This may yield the information bits including the data bits 404 ('b'). In such cases, the shaping bits 406 may be discarded, as they are determined for the purpose of shaping and may not be otherwise used.

In the context of dynamic frozen (e.g., EC, PC, CRC) and pre-transformed polar codes, rather than placing all-zeros in the frozen bit locations, the idea of dynamic frozen or parity check polar code may place a linear combination of the information bits in a subset of the frozen bit locations. For example, in a 5G polar code, 3 additional parity check bits (e.g., obtained from linear shift registers of the information bits) may be added on frozen bit locations to improve performance. In an example for 5G PC polar coding, EC/PC bits may be obtained as $b_{PC}[i]=b_{info}[i-5]+b_{info}[i-10]$ . . . . The location of the EC/PC bits may be selected according to (1) a minimum weight of the index, and 2) a highest reliability among frozen bit locations. Another example of dynamic frozen design is to set all frozen bits after the first information bit to be linear combination of previous info bits. The framework of dynamic frozen polar codes may also include PAC (polarization adjusted convolutional codes) and pre-transformed polar codes, where an upper-triangular matrix is multiplied to the information payload prior to passing through the polar transform 'G'.

In the configuration 460, information bits 416 may be denoted as $v=\{v_0, v_1, v_2, \ldots v_{k-1}\}$. The polar code 403 may map k information-bits v to w, where w has a length of n>k bits, by a corresponding polar sequence such as the polar encoder matrix 410 (G), which may indicate information bit and frozen bit locations. The encoded output 418 may be denoted as $x=\{x_0, x_1, x_2, \ldots x_{n-1}\}$. Accordingly, x=w*T*G, where $$G = \begin{bmatrix} 1 & 0 \\ 1 & 1 \end{bmatrix}^{\otimes m}$$

is the polar encoder matrix 410. For PAC codes, the matrix T, e.g., the multi-diagonal matrix 414, is a multi-diagonal (and hence upper-triangular) matrix, as shown by way of example, where diagonal elements $T(t_{ij})$ are one (1). The multi-diagonal matrix 414 may correspond to a rate-1 convolutional code. For pre-transformed polar code, an arbitrary upper triangular matrix may be used in the encoding.

Figure 5:
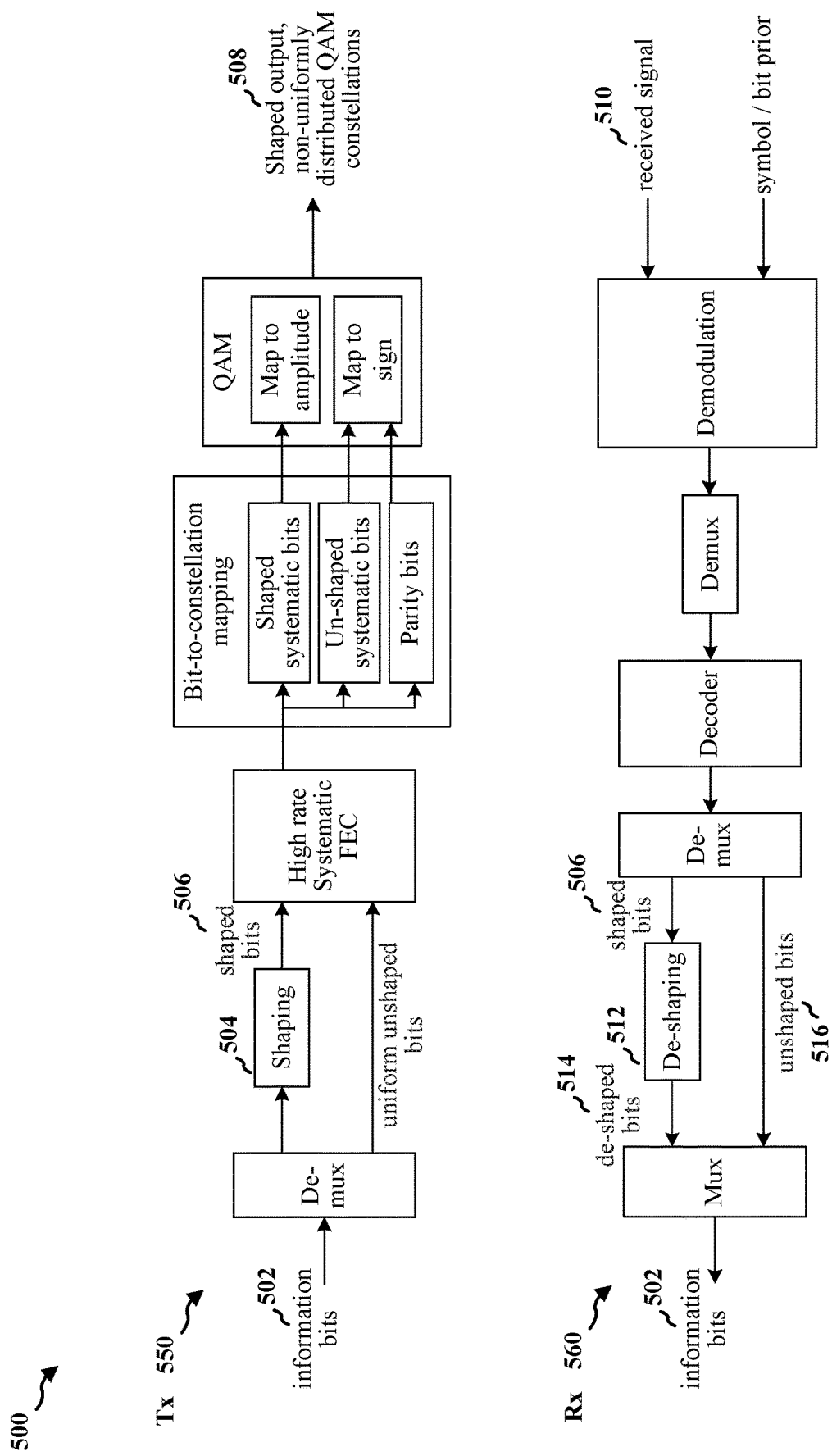
FIG. 5 is a diagram illustrating examples of transmit and receive flows of polar codes for shaping.

FIG. 5 is a diagram 500 illustrating examples of transmit and receive flows of polar codes for shaping. Diagram 500 shows a configuration 550 for a Tx side polar code flow for shaping, and a configuration 560 for an Rx side polar code flow for shaping.

In the configuration 550, for the Tx side polar code flow for shaping, information bits 502, for a payload to be transmitted, may pass through a de-multiplexor, where a portion thereof undergo shaping 504 by polar code, as described above, to generate shaped bits 506. The shaped bits 506 may pass through a high rate systematic FEC and then undergo bit-to-constellation mapping (e.g., based shaped systematic bits, un-shaped systematic bits, and parity bits. Next, a QAM operation is performed (e.g., mapping to amplitude/sign), and a shaped output 508 with non-uniformly distributed QAM constellations is transmitted to a receiver.

In the configuration 560, for the Rx side polar code flow for shaping, a received signal 510, associated with the shaped output 508, is received by the receiver, along with a symbol/bit prior. After demodulation, as described herein, and de-multiplexing of the demodulated signal, a channel decoder performs channel decoding and the channel decoding result de-multiplexed to identify/isolate the shaped bits 506 from the received signal 510. De-shaping 512 is performed on the shaped bits 506, and the resulting de-shaped bits 514 are multiplexed with unshaped bits 516 to recover the information bits 502.

Aspects herein provide techniques and design details for performing probabilistic amplitude shaping/de-shaping using dynamic frozen/parity check polar codes. Such aspects provide improvements to dynamic frozen/PC polar codes that provide performance gains with respect to shaping over standard polar codes. Aspects herein also provide techniques and design details for performing probabilistic amplitude shaping/de-shaping using PAC codes/a pre-transformed polar codes.

Polar codes may be used to perform probabilistic shaping, and performance may be comparable to other shaping techniques, e.g., constant composition distribution matching (CCDM), and its complexity on the Rx side is much smaller than CCDM. Aspects herein are provided for dynamic frozen polar codes (or EC-polar codes, generally) for probabilistic shaping. Aspects enable maximization of shaping with $2^k$ codewords (where k is the number of shaping bits) as in other polar code solutions, while providing improved/increased minimum distance between the codewords over other polar code solutions, by mapping bit of a data payload to be transformed by an EC-polar code using a superposition or add/XOR of a set of data bits of the payload with EC bits, where the EC bits are based on the shaping bits for a target distribution of shaped data. Shaping may be referred to as analogously doing quantization, where the more codewords available in the codebook, the better the quantization performance. On the other hand, PC polar codes have better minimum distance than standard polar codes, and polar codes with better minimum distances are better for quantization.

Aspects herein may be described with reference to PC polar codes, by way of example and not limitation, but aspects are also applicable to CRC polar codes or other types of error check polar codes, and thus aspects may be generally described with reference to error check (EC) polar codes as encompassing different types of error check polar codes (e.g., PC polar codes, CRC polar codes, and/or the like). Aspects herein are applicable to any of the CRC polar, PC polar, dynamic frozen polar, pre-transformed polar, and/or polarization adjusted convolutional polar (PAC) etc., which may be collectively referred to as EC polar. Aspects also include additional examples of EC polar, such as PC-CRC-polar, which includes both PC bits and CRC bits in the same code.

Figure 6:
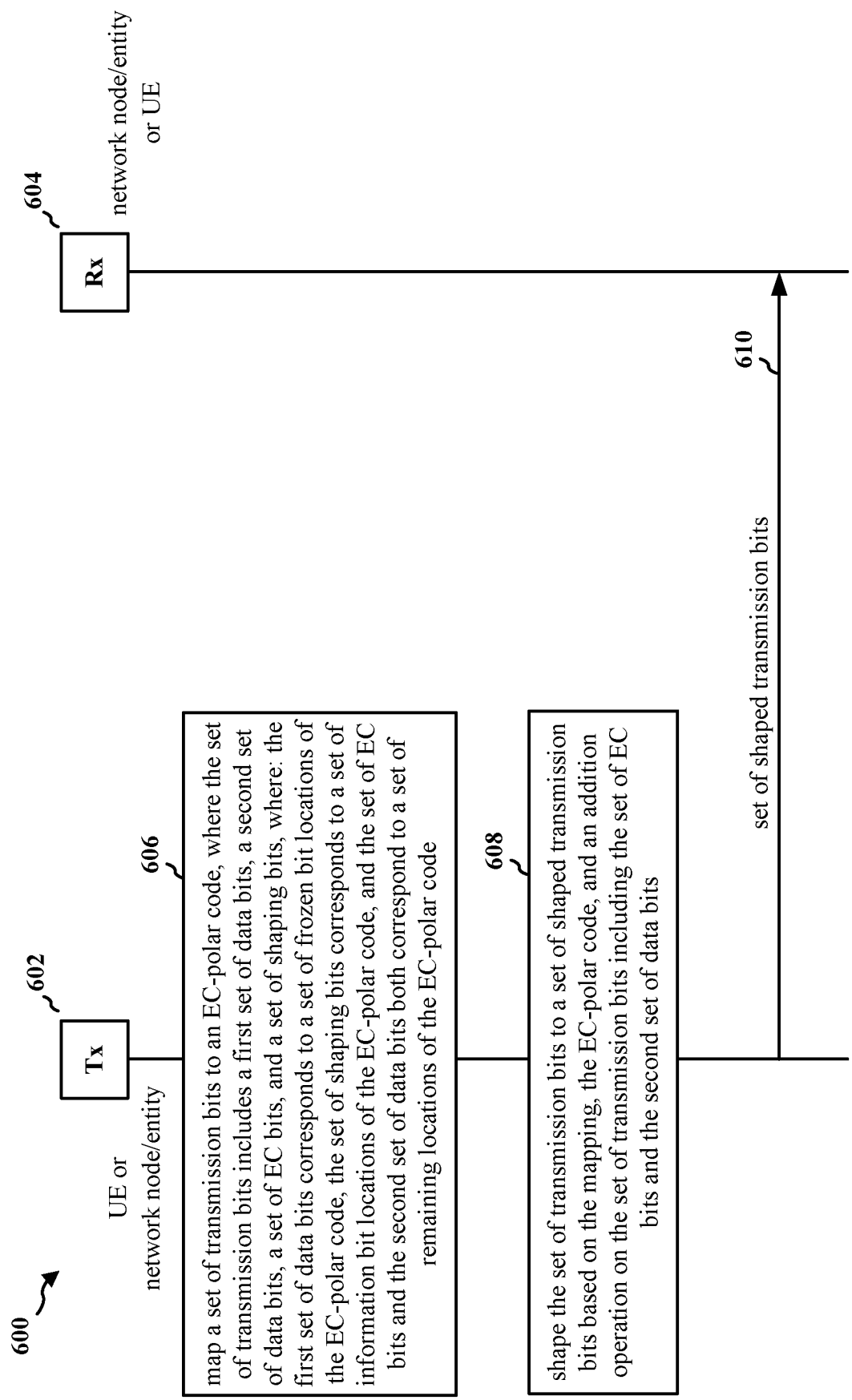
FIG. 6 is a call flow diagram for wireless communications, in accordance with various aspects of the present disclosure.

FIG. 6 is a call flow diagram 600 for wireless communications, in various aspects. Call flow diagram 600 illustrates for dynamic frozen polar codes (or EC-polar codes, generally) for probabilistic shaping for a transmitter network device 602 (Tx) (e.g., a UE or a network node/entity such as a base station (e.g., a gNB or other type of base station or a DU(s), by way of example, as shown and described herein), by way of example) that communicates with a receiver network device 604 (Rx) (e.g., a UE or a network node/entity such as a base station (e.g., a gNB or other type of base station or a DU(s), by way of example, as shown and described herein), in various aspects. Aspects described for base stations, and for network nodes/entities herein, generally, may be performed in aggregated form and/or by one or more components in disaggregated form. Additionally, or alternatively, the aspects may be performed by a UE autonomously, in addition to, and/or in lieu of, operations of a base station.

In the illustrated aspect, the transmitter network device 602 may be configured to map (at 606) a set of transmission bits to an EC-polar code. In such aspects, the set of transmission bits may include a first set of data bits, a second set of data bits, a set of EC bits, and a set of shaping bits. The first set of data bits may correspond to a set of frozen bit locations of the EC-polar code, the set of shaping bits may correspond to a set of information bit locations of the EC-polar code, and the set of EC bits and the second set of data bits may both correspond to a set of remaining locations of the EC-polar code. The total set of data bits associated with the set of transmission bits may include the first set of data bits and the second set of data bits, aspects.

Additionally, the EC-polar code may be associated with a set of available codewords, e.g., based on a transform or matrix of the EC-polar code. The set of available codewords may include $2^K$ available codewords, where K is a number of shaping bits in the set of shaping bits. In aspects, a minimum distance between the codewords of the set of available codewords is greater than a non-EC polar code/a standard polar code, as described herein.

The transmitter network device 602 may be configured to shape (at 608) the set of transmission bits to a set of shaped transmission bits based on the mapping, the EC-polar code, and an addition operation on the set of transmission bits including the set of EC bits and the second set of data bits. The addition operation may include adding, e.g., for non-binary EC polar codes, or may comprise an XOR operation, e.g., for binary EC polar codes. In aspects, to shape (at 608) the set of transmission bits to the set of shaped transmission bits, the transmitter network device 602 may be configured to generate the set of shaping bits based on at least one of a set of log likelihood ratios (LLRs) or a set of probabilities associated with a target distribution of the set of shaped transmission bits and a decoder of the EC-polar code. In aspects, to shape (at 608) the set of transmission bits to the set of shaped transmission bits, the transmitter network device 602 may be configured to generate the set of EC bits based on an EC relation associated with the set of shaping bits.

In some aspects, the set of EC bits may be a set of CRC bits, and the EC relation may be a CRC relation that may be based on a CRC polynomial and a set of polynomial division remainder values associated with the set of shaping bits. In some aspects, the set of EC bits may be a set of PC bits, and the EC relation may be a PC relation that is based on a set of linear combinations of shaping bits in the set of shaping bits. In aspects, the target distribution of the set of shaped transmission bits may be associated with a QAM constellation configuration.

In aspects, to shape (at 608) the set of transmission bits to the set of shaped transmission bits, the transmitter network device 602 may be configured to encode, to a set of encoded bits, the first set of data bits, the set of shaping bits, the second set of data bits, and the set of EC bits in accordance with the EC-polar code. In some aspects, the set of shaped transmission bits may include the set of encoded bits from an output of the EC polar code for an encoder operation, e.g., as performed by an encoder of the EC polar code. The shaping (at 608) performed by the transmitter network device 602 may include shaping the set of transmission bits to the set of shaped transmission bits in a bit domain, e.g., a binary field, for the set of shaped transmission bits.

The transmitter network device 602 may be configured to transmit, to the receiver network device 604 that may be configured to receive, the set of shaped transmission bits 610. In aspects, the set of shaped transmission bits 610 may be transmitted by the transmitter network device 602 with the target distribution associated with the QAM constellation configuration. In aspects, the transmitter network device 602 may be configured to transmit the set of shaped transmission bits associated with the EC-polar code based on an output of a channel encoder associated with the transmitter network device 602.

Figure 7:
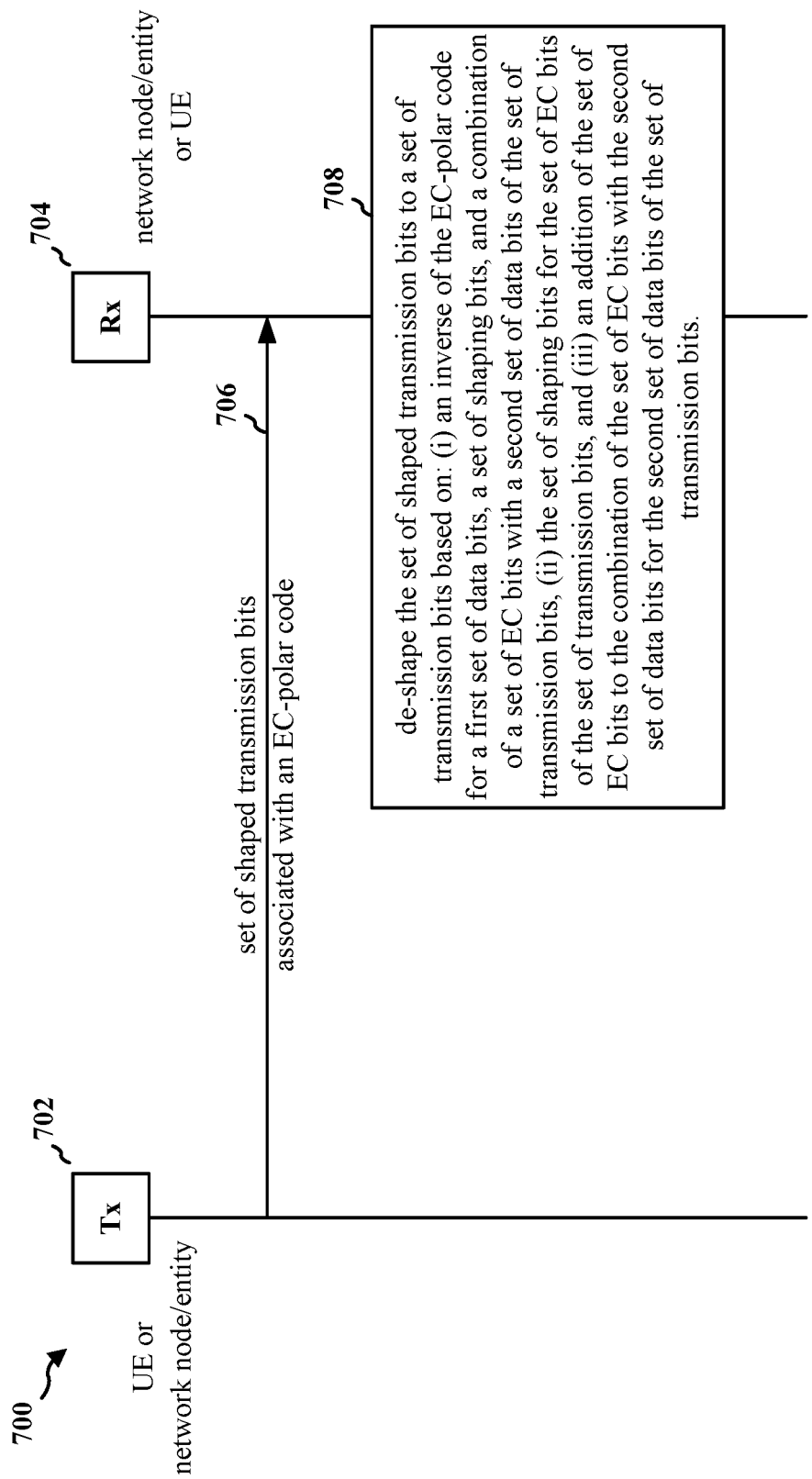
FIG. 7 is a call flow diagram for wireless communications, in accordance with various aspects of the present disclosure.

FIG. 7 is a call flow diagram 700 for wireless communications, in various aspects. Call flow diagram 700 illustrates for dynamic frozen polar codes (or EC-polar codes, generally) for probabilistic shaping for a receiver network device 704 (Tx) (e.g., a UE or a network node/entity such as a base station (e.g., a gNB or other type of base station or a DU(s), by way of example, as shown and described herein), by way of example) that communicates with a transmitter network device 702 (Rx) (e.g., a UE or a network node/entity such as a base station (e.g., a gNB or other type of base station or a DU(s), by way of example, as shown and described herein), in various aspects. Aspects described for base stations, and for network nodes/entities herein, generally, may be performed in aggregated form and/or by one or more components in disaggregated form. Additionally, or alternatively, the aspects may be performed by a UE autonomously, in addition to, and/or in lieu of, operations of a base station.

In the illustrated aspect, the receiver network device 704 may be configured to receive, from the transmitter network device 702 that may be configured to transmit, a set of shaped transmission bits 706 associated with an EC-polar code. In aspects, the set of shaped transmission bits 706 may be transmitted by the transmitter network device 702, and received by the receiver network device 704, with a target distribution associated with the QAM constellation configuration. In aspects, the receiver network device 704 may be configured to receive the set of shaped transmission bits associated with the EC-polar code based on an output of a channel decoder associated with the receiver network device 704.

The receiver network device 704 may be configured to de-shape (at 708) the set of shaped transmission bits to a set of transmission bits. To de-shape (at 708) the set of shaped transmission bits to a set of transmission bits, the receiver network device 704 may be configured to de-shape (at 708) based on (i) an inverse of the EC-polar code for a first set of data bits, a set of shaping bits, and a combination of a set of EC bits with a second set of data bits of the set of transmission bits. To de-shape (at 708) the set of shaped transmission bits to a set of transmission bits, the receiver network device 704 may be configured to de-shape (at 708) based on (ii) the set of shaping bits for the set of EC bits of the set of transmission bits. To de-shape (at 708) the set of shaped transmission bits to a set of transmission bits, the receiver network device 704 may be configured to de-shape (at 708) based on (iii) a subtraction of the set of EC bits from the combination of the set of EC bits with the second set of data bits for the second set of data bits of the set of transmission bits.

In aspects, de-shaping (at 708) by the receiver network device 704 for the set of shaped transmission bits to the set of transmission bits based on (i) the inverse of the EC-polar code may include the receiver network device 704 being configured to identify the first set of data bits, the set of shaping bits, and the combination of the set of EC bits with the second set of data bits by an application of the inverse of the EC-polar code to the set of shaped transmission bits. In aspects, de-shaping (at 708) by the receiver network device 704 for the set of shaped transmission bits to the set of transmission bits based on (ii) the set of shaping bits for the set of EC bits of the set of transmission bits may include the receiver network device 704 being configured to generate the set of EC bits based on an EC relation associated with the set of shaping bits. The set of EC bits may be a set of CRC bits, and the EC relation may be a CRC relation based on a CRC polynomial and a set of polynomial division remainder values associated with the set of shaping bits. The set of EC bits may be a set of PC bits, and the EC relation may be a PC relation based on a set of linear combinations of shaping bits in the set of shaping bits. In aspects, the combination of the set of EC bits with the second set of data bits may be associated with an addition operation thereon/a super-position therebetween.

The de-shaping (at 708) of the set of shaped transmission bits to the set of transmission bits may be performed in a bit domain for the set of shaped transmission bits In aspects, de-shaping (at 708) by the receiver network device 704 for the set of shaped transmission bits to the set of transmission bits based on (iii) a subtraction of the set of EC bits from the combination of the set of EC bits with the second set of data bits may include the receiver network device 704 being configured to add the set of EC bits to the combination of the set of EC bits with the second set of data bits in a bit domain addition operation.

Figure 8:
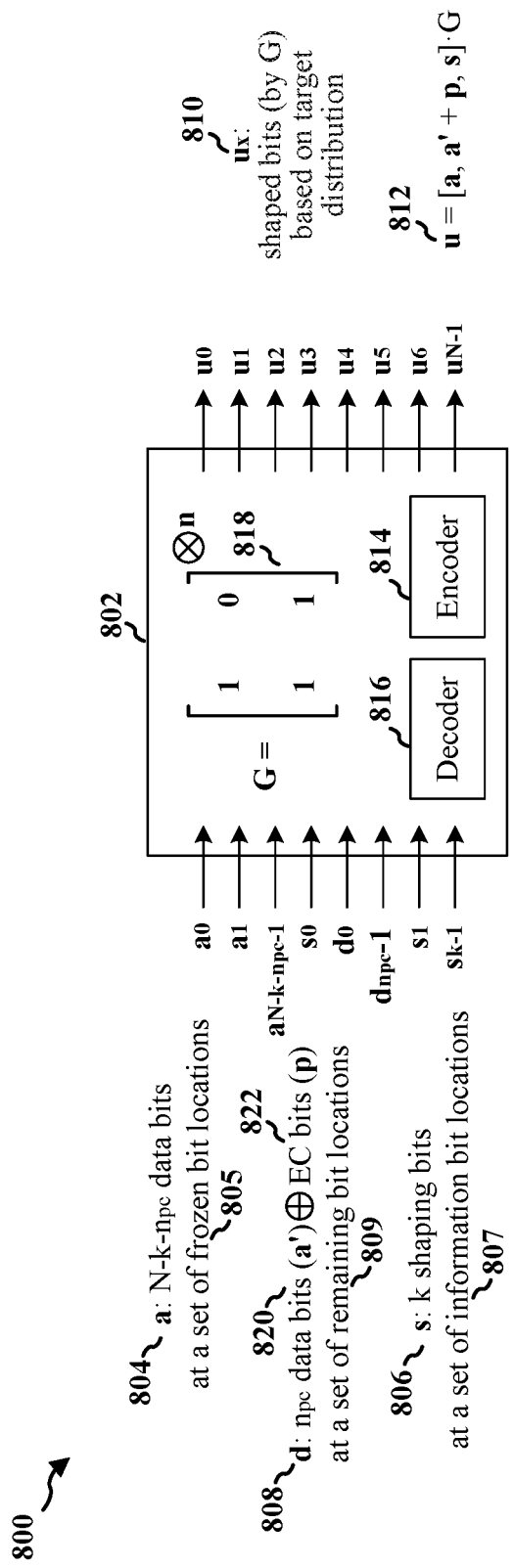
FIG. 8 is a diagram illustrating an example error-check (EC) polar code for probabilistic shaping, in accordance with various aspects of the present disclosure.

FIG. 8 is a diagram 800 illustrating an example EC polar code for probabilistic shaping, in various aspects. Diagram 800 shows an EC polar code 802 that includes an encoder 814 and a decoder 816. In aspects, the EC polar code 802 may be configured to perform shaping/de-shaping for sets of transmission bits utilizing an EC polar encoder matrix 818 (G), as described herein, and may be referred to as a "shaper," in some aspects.

Aspects herein for EC polar code for probabilistic shaping enable the shaping of N–K uniformly distributed data bits into shaped bits 810 of length N (e.g., a codeword 812). For example, a PC-polar code such as the EC polar code 802, may include K information bit locations 807, N–K–$n_{pc}$ frozen bit locations 805, and $n_{PC}$ remaining bit locations 809. Aspects provide for placing the bits to the input of the polar transform (e.g., via the EC polar encoder matrix 818) for the EC polar code 802 as shown in diagram 800, by way of example and illustration. In aspects, K shaping bits (e.g., a set of shaping bits 806 (s)) may be placed at the K information bit locations 807 of the EC polar code 802, and N–K–$n_{pc}$ data bits (e.g., a first set of data bits 804 (a)) may be placed on the frozen bit locations 805. Additionally, in contrast to prior solutions, a combination of bits 808 (d) that includes other data bits+the PC bits (e.g., via super-position/ an XOR operation ('⊕') for the data bits (e.g., a second set of data bits 820 (a')) and the PC bits (e.g., a set of EC bits 822 (p))), may be placed on the remaining $n_{pc}$ bit locations 809. Thus, aspects may enable an EC polar code, e.g., the EC polar code 802, for probabilistic shaping. The codewords 812 may thus be obtained by application of the polar transform G (e.g., the EC polar encoder matrix 818, which may be an N*N matrix) to the mapped bits [a, a'+p, s] (e.g., the codewords 812 may be u=[a, a'+p, s]·G.

Accordingly, the number of the codewords 812 available to select for shaping remains $2^K$ codewords, which is same as a standard polar code, while the minimum distance between the $2^K$ codewords (e.g., the codewords 812) of the EC polar code 802 is larger than a stand polar code.

Figure 9:
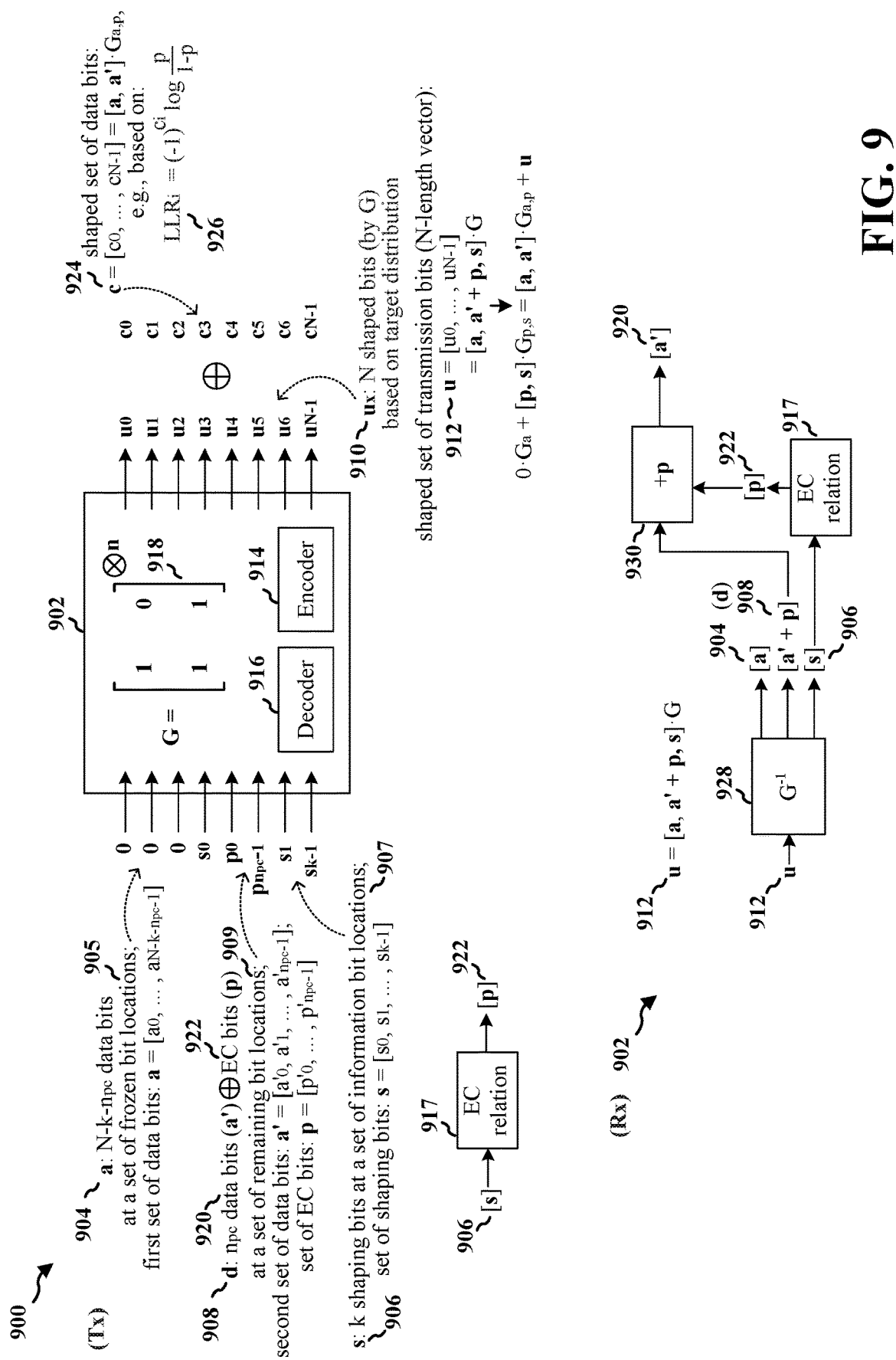
FIG. 9 is a diagram illustrating an example EC polar code for probabilistic shaping, in accordance with various aspects of the present disclosure.

FIG. 9 is a diagram 900 illustrating an example EC polar code for probabilistic shaping, in various aspects. Diagram 900 shows an EC polar code 902 that includes an encoder 914 and a decoder 916. The EC polar code 902 may be an aspect of the EC polar code 802 in FIG. 8. In aspects, the EC polar code 902 may be configured to perform shaping/de-shaping for sets of transmission bits utilizing an EC polar encoder matrix 918, as described herein, and may be referred to as a "shaper," in some aspects.

Aspects herein for EC polar code for probabilistic shaping enable the shaping of N−K uniformly distributed data bits into shaped bits 910 of length N (e.g., a codeword 912). For example, a PC-polar code such as the EC polar code 902, may include K information bit locations 907, N−K−$n_{pc}$ frozen bit locations 905, and $n_{PC}$ remaining bit locations 909. Aspects provide for placing the bits to the input of the polar transform (e.g., via the EC polar encoder matrix 918) for the EC polar code 902 as shown in diagram 900, by way of example and illustration. In aspects, K shaping bits (e.g., a set of shaping bits 906 ($s=[s_0, s_1, \ldots, s_{K-1}]$)) may be placed at the K information bit locations 907 of the EC polar code 902, and N−K−$n_{pc}$ data bits (e.g., a first set of data bits 904 ($a=[a_0, \ldots a_{N-K-n_{pc}-1}]$)) may be placed on the frozen bit locations 905. Additionally, in contrast to prior solutions, a combination of bits 908 (*d*) that includes: other data bits+the PC bits (e.g., via super-position/an XOR operation ('@') of the other data bits (e.g., a second set of data bits 920 ($a'=[a'_0, a'_1, \ldots, a'_{n_{pc}-1}]$) and the PC bits (e.g., a set of EC bits 922 ($p=[p_0, \ldots, p_{n_{pc}-1}]$)), may be placed on the remaining $n_{pc}$ bit locations 909. Thus, aspects may enable an EC polar code, e.g., the EC polar code 902, for probabilistic shaping.

In aspects, a shaper, e.g., as represented by the EC polar code 902 as configured to perform shaping/de-shaping for sets of transmission bits utilizing the EC polar encoder matrix 918, may be configured, for each realization of a and a', to identify/calculate/generate/determine s and p(s) (e.g., the set of shaping bits 906 ($s=[s_0, s_1, \ldots, s_{K-1}]$) and the set of EC bits 922 ($p=[p_0, \ldots, p_{n_{pc}-1}]$)), such that the length-N vector u=[a, a'+p, s]·G (e.g., the codeword 912) has the desired distribution. In aspects, the set of EC bits may be generated based on an EC relation 917 associated with the set of shaping bits 906 ($s=[s_0, s_1, \ldots, s_{K-1}]$). In aspects where the set of EC bits 922 ($p=[p_0, \ldots, p_{n_{pc}-1}]$) may be a set of CRC bits, the EC relation 917 may be a CRC relation based on a CRC polynomial and a set of polynomial division remainder values associated with the set of shaping bits 906 ($s=[s_0, s_1, \ldots, s_{K-1}]$). In aspects where the set of EC bits 922 ($p=[p_0, \ldots, p_{n_{pc}-1}]$) may be a set of PC bits, the EC relation 917 may be a PC relation based on a set of linear combinations of shaping bits in the set of shaping bits 906 ($s=[s_0, s_1, \ldots, s_{K-1}]$).

In this context, the codeword 912 representation for the length-N vector may be rewritten as: $0 \cdot G_a + [p,s] \cdot G_{p,s} = [a,a'] \cdot G_{a,p} + u$, where the left hand side of the rewritten representation/equation is the EC polar code 902 (e.g., where all frozen bits are set to zero), and the left hand side of the rewritten representation/equation comprises the shaped bits $u_x$, and a scrambling sequence that may be generated from a shaped set of data bits 924: $c=[a,a'] \cdot G_{a,p}$. In such aspects, $G_{p,s}$ denotes the submatrix obtained by stacking the subset of rows in G that correspond to the information bit locations and PC bit locations 907, and $G_{a,p}$ denotes the submatrix of G obtained by stacking the subset of rows in G that correspond to the frozen bit locations 905 and the remaining $n_{pc}$ bit locations 909 (e.g., PC bit locations).

In aspects, the set of EC bits 922 ($p=[p_0, \ldots, p_{n_{pc}-1}]$) may be computed/generated from the set of shaping bits 906 ($s=[s_0, s_1, \ldots, s_{K-1}]$) during the decoding by the decoder 916. Based on the formulation described above, the decoder 916 may be configured to decode the set of shaping bits 906 ($s=[s_0, s_1, \ldots, s_{K-1}]$) by treating the right hand side of the representation $0 \cdot G_a + [p,s] \cdot G_{p,s} = [a,a'] \cdot G_{a,p} + u$, as the received signal $c=[a,a'] \cdot G_{a,p}$ (e.g., a shaped set of data bits 924) plus some additive noise u, whose distribution is the target probability distribution for shaping by the EC polar code 902. In aspects for probabilistic shaping, LLRs 926 may be based on the target probability distribution. For instance, such LLRs 926 may be set to:

$$LLR_i = (-1)^{c_i} \log \frac{p}{1-p},$$

where p denotes the probability of 0 in the target distribution. The LLRs 926 may be used as the input to the EC polar code 902 to decode the set of shaping bits 906 ($s=[s_0, s_1, \ldots, s_{K-1}]$) by the decoder 916, and from the set of shaping bits 906 ($s=[s_0, s_1, \ldots, s_{K-1}]$), the set of EC bits 922 ($p=[p_0, \ldots, p_{n_{pc}-1}]$) may be calculated using the EC encoding rule of the encoder 914. In some aspects, the decoder 916 may directly receive a target probability as its input, e.g., rather than the LLRs 926, to perform decoding.

Accordingly, the number of options for the codeword 912 available to select for shaping and subsequent transmission by a transmitter network device (e.g., the transmitter network device 602 in FIG. 6/702 in FIG. 7) in the described aspects remains as $2^K$ codewords, which is same as a standard polar code, while the minimum distance between the $2^K$ codewords (e.g., generated/available ones of the codeword 912) of the EC polar code 902 is larger than a stand polar code.

In the context of receiving such a shaped transmission by a receiver network device (e.g., the receiver network device 604 in FIG. 6/704 in FIG. 7), the EC polar code 902 may be configured to operate as a de-shaper for the shaped transmission in a manner, according to aspects herein, that is different from a standard polar codes.

In aspects, after reception of the transmitted data, described above, the receiver network device may be configured to obtain the codeword 912 (*u*) using its channel decoder. The relation u=[a,a'+p,s]·G, as described herein, may be used to recover the portion [a,a'+p,s] utilizing/by application of an inverse matrix 928 of the EC polar encoder matrix 918 of the EC polar code 902, where the inverse matrix 928 $uG^{-1}=uG$. Accordingly, the EC polar code 902 may be configured to extract/obtain the set of shaping bits 906 ($s=[s_0, s_1, \ldots, s_{K-1}]$) and the first set of data bits 904 ($a=[a_0, \ldots a_{N-K-n_{pc}-1}]$) from the codeword 912 (*u*). From the set of shaping bits 906 ($s=[s_0, s_1, \ldots, s_{K-1}]$), the EC polar code 902 may be configured to calculate/obtain the set of EC bits 922 ($p=[p_0, \ldots, p_{n_{pc}-1}]$) based on the EC relation 917, as described above. The EC polar code 902 may also be configured to calculate/obtain the second set of data bits 920 ($a'=[a'_0, a'_1, \ldots, a'_{n_{pc}-1}]$). In aspects, the EC polar code 902 may be configured to perform an addition operation 930 to calculate/obtain the second set of data bits 920 ($a'=[a'_0, a'_1, \ldots, a'_{n_{pc}-1}]$) from the combination of bits 908 (*d*) (e.g., [a'+p]) and the set of EC bits 922 ($p=[p_0, \ldots, p_{n_{pc}-1}]$). In one example, the addition operation may be represented by: $a'=(a'+p)+p$. In aspects, one or more of the above operations may be performed in the bit domain, e.g., a binary field, and can be performed with minimal complexity, e.g., the EC-polar code may be a binary EC polar code, and in such aspects, $p+p=p-p=0$; that is, both additional and subtraction operations are equivalent to the XOR in the bit domain/binary field. Additionally, aspects herein include applications for non-binary EC-polar code scenarios. Such aspects may include defined over a Galois field of integer mod q (e.g., GF(q)). Accordingly, the XOR operation utilized for binary field applications may be interpreted as addition over the non-binary field operations. That is, in non-binary EC-polar cases, the equation $a'=(a'+p)+p$ may be modified as $a'=(a'+p)-p$, such that $p-p=0$.

The aspects described above may also be applicable to arbitrary PC/dynamic frozen polar codes, regardless of length of PC/dynamic frozen bits, and the PC/dynamic frozen constraint.

Figure 10:
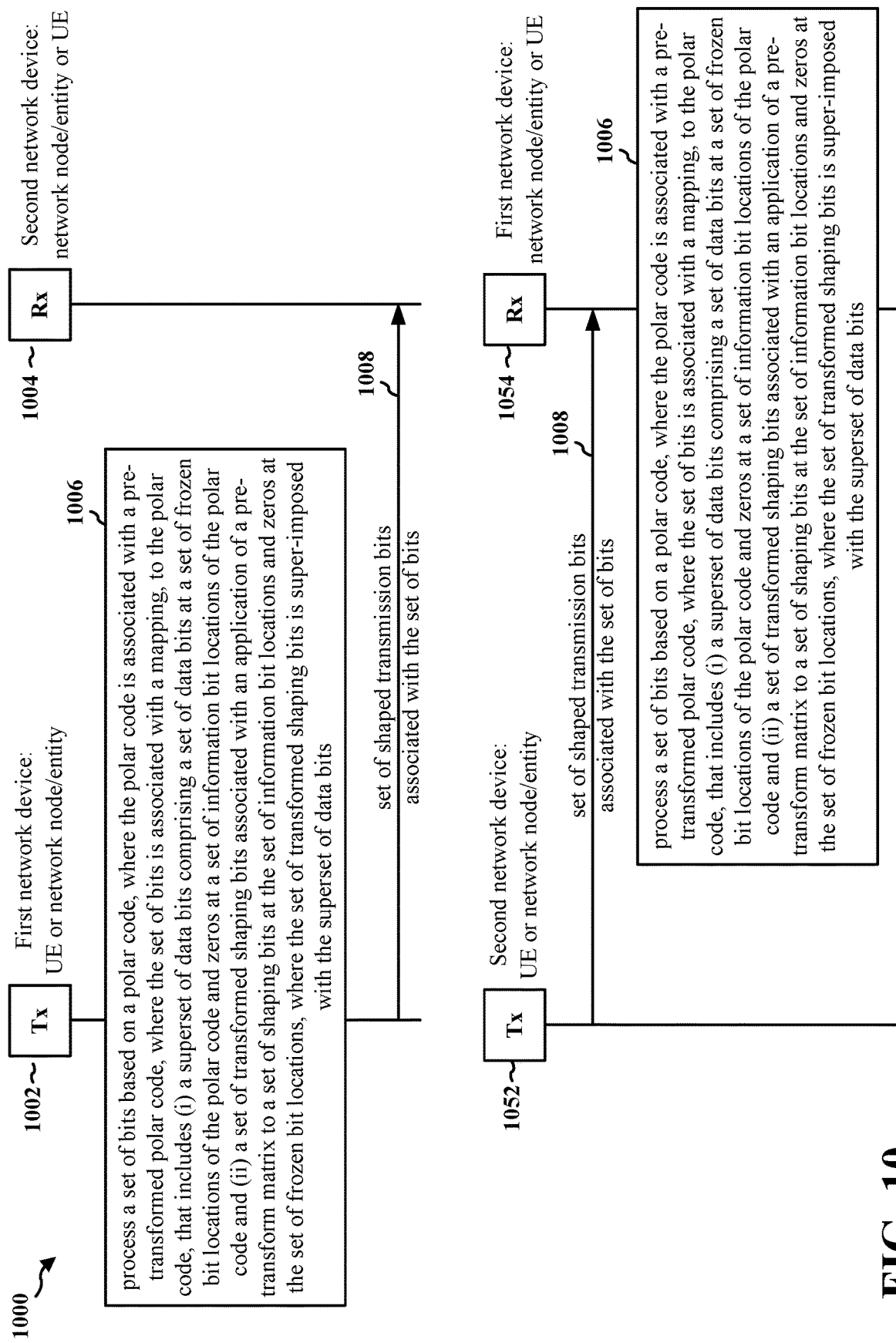
FIG. 10 is a call flow diagram for wireless communications, in accordance with various aspects of the present disclosure.

FIG. 10 is a call flow diagram 1000 for wireless communications, in various aspects. Call flow diagram 1000 illustrates for dynamic frozen polar codes (or EC-polar codes, generally) for probabilistic shaping in the context of PAC/pre-transformed polar codes for a first network device. In aspects, the first network device may be a transmitter network device 1002 (Tx) or a receiver network device 1054 (Rx) (e.g., a UE or a network node/entity such as a base station (e.g., a gNB or other type of base station or a DU(s), by way of example, as shown and described herein), by way of example) that communicates with a second network device, which may be a receiver network device 1004 (Rx) or a transmitter network device 1052 (e.g., a UE or a network node/entity such as a base station (e.g., a gNB or other type of base station or a DU(s), by way of example, as shown and described herein), in various aspects. Aspects described for base stations, and for network nodes/entities herein, generally, may be performed in aggregated form and/or by one or more components in disaggregated form. Additionally, or alternatively, the aspects may be performed by a UE autonomously, in addition to, and/or in lieu of, operations of a base station.

In the illustrated aspect, the first network device (e.g., the transmitter network device 1002 or the receiver network device 1054) may be configured to process (at 1006) a set of bits based on a polar code. The polar code may be associated with at least one of a PAC code or a pre-transformed polar code, and the set of bits may be associated with a mapping to the polar code. The mapping may include (i) a superset of data bits comprising a set of data bits at a set of frozen bit locations of the polar code and zeros at a set of information bit locations of the polar code and (ii) a set of transformed shaping bits associated with an application of an upper-triangular matrix to a set of shaping bits at the set of information bit locations and zeros at the set of frozen bit locations. In aspects, the upper-triangular matrix may include a set of diagonal elements equal to one, and the set of transformed shaping bits may be super-imposed with the superset of data bits (e.g., a super-position).

In aspects where the first network device is the transmitter network device 1002, and the second network device is the receiver network device 1004, the first network device, to process (at 1006) the set of bits based on the polar code, may be configured to shape the set of data bits to the set of shaped transmission bits based on the mapping and the polar code. The first network device may be configured, for the shaping, to generate the set of shaping bits based on the target distribution and a decoder associated with the EC polar code. In aspects, the set of shaping bits may be generated based on a set of LLRs/probabilities associated with a target distribution of the set of shaped transmission bits and the decoder of the polar code. The first network device may be configured, for the shaping to, encode, to a set of encoded bits, the set of data bits and the set of transformed shaping bits in accordance with the polar code. The set of shaped transmission bits may include the set of encoded bits from an output of the polar code for an encoder operation.

The first network device may be configured to communicate, with the second network device, a set of shaped transmission bits 1008 associated with the set of bits prior to or subsequent to processing (at 1006) the set of bits based on the polar code. In aspects where the first network device is the transmitter network device 1002, and the second network device is the receiver network device 1004, the first network device may be configured to transmit the set of shaped transmission bits 1008 to the receiver (second) network device subsequent to processing (at 1006) the set of bits based on the polar code. In aspects where the first network device is the receiver network device 1054, and the second network device is the transmitter network device 1052, the first network device the first network device may be configured to receive the set of shaped transmission bits 1008 from the transmitter (second) network device prior to processing (at 1006) the set of bits based on the polar code.

In aspects where the first network device is the receiver network device 1054, and the second network device is the transmitter network device 1052, the first network device, to process (at 1006) the set of bits based on the polar code, may be configured to de-shape the set of shaped transmission bits 1008 to the set of data bits based on the mapping and an inverse of the polar code. In aspects, to de-shape the set of shaped transmission bits 1008 to the set of data bits based on the mapping and the inverse of the polar code, the first network device may be configured to identify a transformed shaping bit subset of the set of transformed shaping bits as being zeros based on the transformed shaping bit subset being located before a first shaping bit at a first information bit location of the set of information bit locations. In aspects, to de-shape the set of shaped transmission bits 1008 to the set of data bits based on the mapping and the inverse of the polar code, the first network device may be configured to identify a bit subset of the superset of data bits based on the inverse of the polar code and the transformed shaping bit subset being zeros.

In aspects, to de-shape the set of shaped transmission bits 1008 to the set of data bits based on the mapping and the inverse of the polar code, the first network device may also be configured to, for each transformed shaping bit of the set of transformed shaping bits after the transformed shaping bit subset, identify the transformed shaping bit as being zero if the transformed shaping bit is in a frozen bit location of the set of frozen bit locations, and identify a corresponding bit of the superset of data bits, which corresponds via a first super-position with the transformed shaping bit, based on the inverse of the polar code, a corresponding element of the upper-triangular matrix, and the transformed shaping bit being zero. In aspects, to de-shape the set of shaped transmission bits 1008 to the set of data bits based on the mapping and the inverse of the polar code, the first network device may also be configured to, for each bit of the superset of data bits after the bit subset, identify the bit as being zero if the bit is in an information bit location of the set of information bit locations, and identify a corresponding transformed shaping bit of the set of transformed shaping bits, which corresponds via a second super-position with the bit, based on the inverse of the polar code, the corresponding element of the upper-triangular matrix, and the bit being zero.

Figure 11:
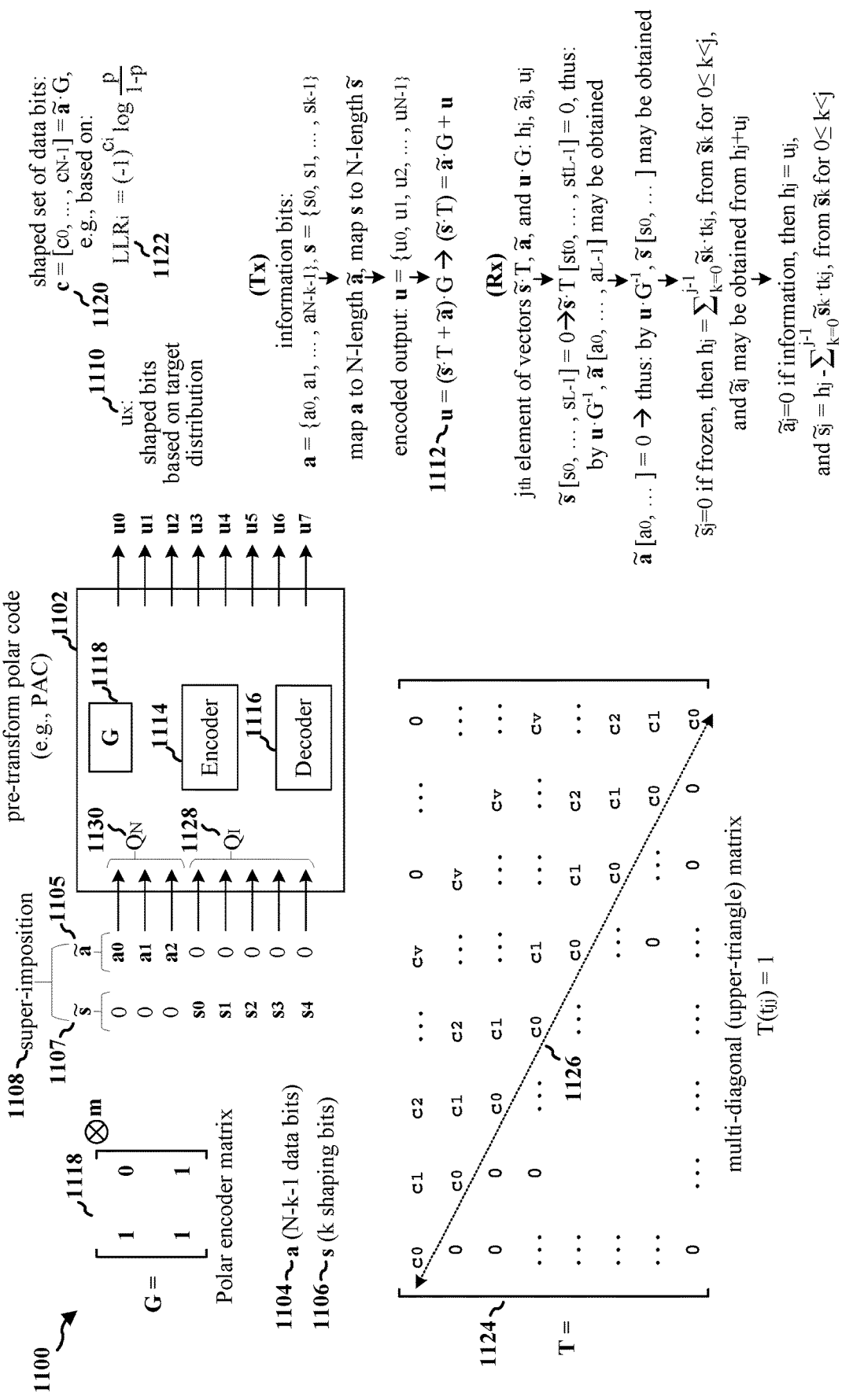
FIG. 11 is a diagram illustrating an example of polarization adjusted convolutional (PAC) code/pre-transformed polar code for probabilistic shaping, in accordance with various aspects of the present disclosure.

FIG. 11 is a diagram 1100 illustrating an example of a PAC code/a pre-transformed polar code for probabilistic shaping, in various aspects. Diagram 1100 shows a polar encoder matrix 1118 (G) and an associated input bit configuration that may be utilized for a PAC code/a pre-transformed polar code (e.g., a polar code 1102, by way of example), with an encoder 1114, a decoder 1116, and an associated upper-triangular matrix 1124 (e.g., an upper-triangle matrix), for probabilistic shaping. The generalization of PAC/pre-transformed polar codes for shaping is now described.

With reference to a PAC code/a pre-transformed polar code generally (e.g., the polar code 1102), an upper triangular matrix T (e.g., the upper-triangular matrix 1124) may be multiplied with the frozen and information bits, prior to applying the polarization transform, e.g., the polar encoder matrix 1118 (G) of 1102, where $$G = \begin{bmatrix} 1 & 0 \\ 1 & 1 \end{bmatrix}^{\otimes m},$$

and the diagonal elements 1126 of the upper-triangular matrix 1124 (e.g., $T(t_{jj})$) are one ('1'), in aspects. In aspects, a set of information bit locations 1128 and a set of frozen bit locations 1130 are denoted by $Q_I$, and $Q_N$, respectively.

In aspects, information bits to be transmitted in a shaped codeword (e.g., a codeword 1112) may be associated with a set of data bits 1104 (a=[$a_0$, ... $a_{N-K-1}$]) and or a set of shaping bits 1106 (s=[$s_0$, $s_1$, ..., $s_{K-1}$]), which may be determined from the set of data bits 1104 ($a$). A superposition 1108 between the set of data bits 1104 and the set of shaping bits 1106 may be utilized to achieve shaping with an available number $2^K$ of the codeword 1112 and advantageous minimum distances therebetween. In this context, a superset of data bits 1105 ($\tilde{a}$) may be a length N vector in which the set of data bits 1104 (a=[$a_0$, ... $a_{N-K-1}$]) are mapped to/placed in the set of frozen bit locations 1130 ($Q_N$) of the polar code 1102, and 0's (zeros) are mapped to/placed in the set of information bit locations 1128 ($Q_I$) of the polar code 1102. For shaping bits, a set of shaping bits 1107 ($\tilde{s}$) may be a length N vector associated with the set of shaping bits 1106 (s=[$s_0$, $s_1$, ..., $S_{K-1}$]), in which the set of shaping bits 1106 (s=[$s_0$, $s_1$, ..., $S_{K-1}$]) are mapped to/placed in the set of information bit locations 1128 ($Q_I$) of the polar code 1102, and 0's (zeros) are mapped to/placed in the set of frozen bit locations 1130 ($Q_N$) of the polar code 1102. The set of shaping bits 1107 ($\tilde{s}$) may further be associated with an application of an upper-triangular matrix (e.g., the upper-triangular matrix 1124) to generate a set of pre-transformed shaping bits ($\tilde{s} \cdot T$).

The set of shaped bits 1110 (e.g., the codeword 1112) may be generated according to the relation ($\tilde{s} \cdot T + \tilde{a}$)·G=u, which may be represented as the relation ($s_r \cdot T$)=$a_r \cdot G+u$, where the upper-triangular matrix 1124 (T) is applied to the set of shaping bits 1107 ($s$) but not to the superset of data bits 1105 ($\tilde{a}$), which are super-imposed with the set of pre-transformed shaping bits ($\tilde{s} \cdot T$).

At the Tx side, e.g., for a transmitter network device, such a device may be configured to perform similar steps, as in the EC polar code aspects described above for FIG. 9, by initializing an LLR 1122 as:

$$LLR_i = (-1)^{c_i} \log \frac{p}{1-p},$$

where $c_i$ denotes the ith element of a vector c (e.g., a shaped set of data bits 1120), where: c=$\tilde{a}$G, and the PAC/pre-transformed polar code elements are denoted as: $\tilde{s} \cdot T \cdot G$. In some aspects, as noted above, a probability (p) may be utilized in place of the LLR 1122, and the decoder 1116 may receive the probability (p) when $c_i$=0 and (1−p) when $c_i$=1.

At the Rx side, e.g., for a receiver network device, the polar code 1102 may be configured to obtain the codeword 1112 (u, which may be generated according to the relation ($\tilde{s} \cdot T + \tilde{a}$)·G=u) from a channel decoder. According to aspects, the polar code 1102 may be configured to recover the superset of data bits 1105 ($a$) from the codeword 1112 ($u$), and in doing so, the polar code 1102 may be configured to separate the superset of data bits 1105 ($\tilde{a}$) and the set of shaping bits 1107 ($\tilde{s}$), as associated with the application of the upper-triangular matrix 1124 (e.g., $\tilde{s} \cdot T$, a set of pre-transformed shaping bits), in accordance with the sum: $\tilde{s} \cdot T + \tilde{a} = u \cdot G^{-1}$. In aspects, the jth element in each of the vector $\tilde{s} \cdot T$, the vector $\tilde{a}$, and the vector $u \cdot G^{-1}$, may be represented as $h_j$, $\tilde{a}_j$, $u_j$, respectively. However, due to the construction described above, $\tilde{s} \cdot T$ may occupy both of the information bit locations 1128 and the frozen bit locations 1130, and are thus super-imposed with the superset of data bits 1105 ($\tilde{a}$) (or more specifically, with the set of data bits 1104 ($a$)). Yet, the aspects herein enable utilization of the upper-triangular matrix 1124 (T) being an upper triangular matrix with diagonal $t_{jj}$=1. Accordingly, aspects provide for the jth bit $h_j$ in the vector $\tilde{s} \cdot T$ to depend on the first j bits of the set of transformed shaping bits 1107 ($\tilde{s}$), while not depending on other bits.

In aspects, each of the bits in the set of transformed shaping bits 1107 ($\tilde{s}$) before the first shaping bit may be zero (e.g., the first L bits), and therefore, the corresponding first L bits in the vector $\tilde{s} \cdot T$ are also zero. In accordance with this relation, the first L bits of the superset of data bits 1105 ($\tilde{a}$) may be recovered as the first L bits for an application of the inverse of the polar code 1102 with the codeword 1112: $u \cdot G^{-1}$, where $G^{-1}$ is the inverse.

For the first shaping bits '$s_0$' in the set of transformed shaping bits 1107 ($\tilde{s}$), the corresponding location in the superset of data bits 1105 ($\tilde{a}$) is a 0 (zero), and thus, the polar code 1102 may be configured to obtain $s_0$ from $u \cdot G^{-1}$. For all bits after the first shaping bits, e.g., bit $\tilde{s}_j$, if the corresponding location is a frozen bit, then $\tilde{s}_j$=0, and the polar code 1102 may be configured to calculate $$h_j = \sum_{k=0}^{j-1} \tilde{s}_k t_{kj}$$

from the shaping bits up to j−1, and then to obtain the data bits $\tilde{a}_j = uv_j - h_j$. If the corresponding location is an information bit location, then $\tilde{a}_j$=0, and therefore, $h_j$=$u_j$. Then, the polar code 1102 may be configured to recover $$\tilde{s}_J = h_j = \sum_{k=0}^{j-1} \tilde{s}_k t_{kj}$$

from all previously determined $s_k$'s for $0 \le k < j$. The aspects described above may be performed sequentially, until all data bits in in the superset of data bits 1105 ($\tilde{a}$) are obtained via separation of in the superset of data bits 1105 ($\tilde{a}$) from the sum $\tilde{s} \cdot T + \tilde{a}$ by exploiting the upper-triangular nature of the upper-triangular matrix 1124 (T).

Figure 12:
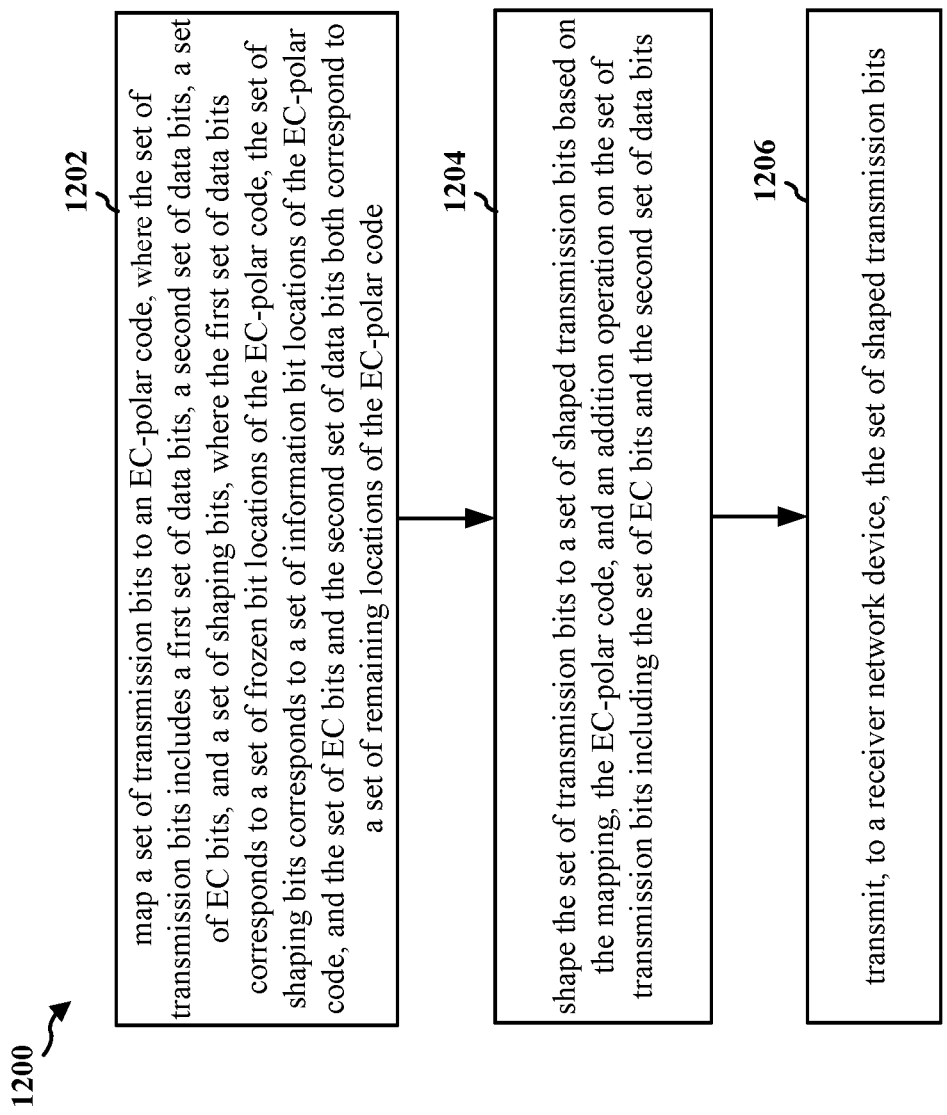
FIG. 12 is a flowchart of a method of wireless communication.

FIG. 12 is a flowchart 1200 of a method of wireless communication. The method may be performed by a transmitter network device (e.g., the transmitter network device 602, 702, 1002, 1052; the UE 104; the apparatus 1504; the base station 102; the network entity 1502, 1602). In some aspects, the method may include aspects described in connection with the communication flows in FIGS. 6, 7, 10, and/or aspects described in FIGS. 4, 5, 8, 9, 11. The method may be for dynamic frozen polar codes for probabilistic shaping. The method may enable maximization of shaping with $2^k$ codewords (where k is the number of shaping bits) as in other polar code solutions, as well as improvements/increases in the minimum distance between the codewords over other polar code solutions by mapping bit of a data payload to be transformed by an EC-polar code using a super-position or XOR of a set of data bits of the payload with EC bits.

At 1202, the transmitter network device maps a set of transmission bits to an EC-polar code, where the set of transmission bits includes a first set of data bits, a second set of data bits, a set of EC bits, and a set of shaping bits, where the first set of data bits corresponds to a set of frozen bit locations of the EC-polar code, the set of shaping bits corresponds to a set of information bit locations of the EC-polar code, and the set of EC bits and the second set of data bits both correspond to a set of remaining locations of the EC-polar code. As an example, the mapping may be performed by one or more of the component 198, the transceiver(s) 1522, and/or the antenna 1580 in FIG. 15, and or may be performed by one or more of the component 199, the transceiver(s) 1646, and/or the antenna 1680 in FIG. 16. FIGS. 6, 8, 9 illustrate an example of the transmitter network device 602 mapping such a set of transmission bits to an EC-polar code.

The transmitter network device 602 may be configured to map (at 606) a set of transmission bits to an EC-polar code. In such aspects, the set of transmission bits may include a first set of data bits, a second set of data bits, a set of EC bits, and a set of shaping bits. The first set of data bits may correspond to a set of frozen bit locations of the EC-polar code, the set of shaping bits may correspond to a set of information bit locations of the EC-polar code, and the set of EC bits and the second set of data bits may both correspond to a set of remaining locations of the EC-polar code. The total set of data bits associated with the set of transmission bits may include the first set of data bits and the second set of data bits, aspects.

Additionally, the EC-polar code may be associated with a set of available codewords, e.g., based on a transform or matrix of the EC-polar code. The set of available codewords may include $2^K$ available codewords, where K is a number of shaping bits in the set of shaping bits. In aspects, a minimum distance between the codewords of the set of available codewords is greater than a non-EC polar code/a standard polar code, as described herein.

Diagram 800 in FIG. 8 shows an EC polar code 802 that includes an encoder 814 and a decoder 816. In aspects, the EC polar code 802 may be configured to perform shaping/de-shaping for sets of transmission bits utilizing an EC polar encoder matrix 818 (G), as described herein, and may be referred to as a "shaper," in some aspects. Aspects herein for EC polar code for probabilistic shaping enable the shaping of N–K uniformly distributed data bits into shaped bits 810 of length N (e.g., a codeword 812). For example, a PC-polar code such as the EC polar code 802, may include K information bit locations 807, N–K–$n_{pc}$ frozen bit locations 805, and $n_{pc}$ remaining bit locations 809. Aspects provide for placing the bits to the input of the polar transform (e.g., via the EC polar encoder matrix 818) for the EC polar code 802 as shown in diagram 800, by way of example and illustration. In aspects, K shaping bits (e.g., a set of shaping bits 806 (s)) may be placed at the K information bit locations 807 of the EC polar code 802, and N–K–$n_{pc}$ data bits (e.g., a first set of data bits 804 (a)) may be placed on the frozen bit locations 805. Additionally, in contrast to prior solutions, a combination of bits 808 (d) that includes other data bits+the PC bits (e.g., via super-position/an XOR operation ('⊕') for the data bits (e.g., a second set of data bits 820 (a') and the PC bits (e.g., a set of EC bits 822 (p))), may be placed on the remaining $n_{pc}$ bit locations 809. Thus, aspects may enable an EC polar code, e.g., the EC polar code 802, for probabilistic shaping. Accordingly, the number of the codewords 812 available to select for shaping remains $2^K$ codewords, which is same as a standard polar code, while the minimum distance between the $2^K$ codewords (e.g., the codewords 812) of the EC polar code 802 is larger than a stand polar code.

Diagram 900 in FIG. 9, shows an EC polar code 902 that includes an encoder 914 and a decoder 916. The EC polar code 902 may be an aspect of the EC polar code 802 in FIG. 8. In aspects, the EC polar code 902 may be configured to perform shaping/de-shaping for sets of transmission bits utilizing an EC polar encoder matrix 918, as described herein. Aspects herein for EC polar code for probabilistic shaping enable the shaping of N–K uniformly distributed data bits into shaped bits 910 of length N (e.g., a codeword 912). For example, a PC-polar code such as the EC polar code 902, may include K information bit locations 907, N–K–$n_{pc}$ frozen bit locations 905, and $n_{PC}$ remaining bit locations 909. Aspects provide for placing the bits to the input of the polar transform (e.g., via the EC polar encoder matrix 918) for the EC polar code 902 as shown in diagram 900, by way of example and illustration. In aspects, K shaping bits (e.g., a set of shaping bits 906 ($s=[s_0, s_1, \ldots, s_{K-1}]$)) may be placed at the K information bit locations 907 of the EC polar code 902, and N–K–$n_{pc}$ data bits (e.g., a first set of data bits 904 ($a=[a_0, \ldots a_{N-K-n_{pc}-1}]$)) may be placed on the frozen bit locations 905. Additionally, in contrast to prior solutions, a combination of bits 908 (d) that includes: other data bits+the PC bits (e.g., via super-position/an XOR operation ('⊕') of the other data bits (e.g., a second set of data bits 920 ($a'=[a_0', a'_1, \ldots, a'_{n_{pc}-1}]$))) and the PC bits (e.g., a set of EC bits 922 ($p=[p_0, \ldots, p_{n_{pc}-1}]$)), may be placed on the remaining $n_{pc}$ bit locations 909. Thus, aspects may enable an EC polar code, e.g., the EC polar code 902, for probabilistic shaping.

At 1204, the transmitter network device shapes the set of transmission bits to a set of shaped transmission bits based on the mapping, the EC-polar code, and an addition operation on the set of transmission bits including the set of EC bits and the second set of data bits. As an example, the shaping may be performed by one or more of the component 198, the transceiver(s) 1522, and/or the antenna 1580 in FIG. 15, and or may be performed by one or more of the component 199, the transceiver(s) 1646, and/or the antenna 1680 in FIG. 16. FIGS. 6, 8, 9 illustrate an example of the transmitter network device 602 shaping such a set of transmission bits to a set of shaped transmission bits.

The transmitter network device 602 may be configured to shape (at 608) the set of transmission bits to a set of shaped transmission bits based on the mapping, the EC-polar code, and an addition operation on the set of transmission bits including the set of EC bits and the second set of data bits. In aspects, to shape (at 608) the set of transmission bits to the set of shaped transmission bits, the transmitter network device 602 may be configured to generate the set of shaping bits based on the target distribution and a decoder associated with the EC polar code. In aspects, the set of shaping bits may be generated based on a set of log likelihood ratios (LLRs)/probabilities associated with a target distribution of the set of shaped transmission bits and the decoder of the EC-polar code. In aspects, to shape (at 608) the set of transmission bits to the set of shaped transmission bits, the transmitter network device 602 may be configured to generate the set of EC bits based on an EC relation associated with the set of shaping bits.

In some aspects, the set of EC bits may be a set of CRC bits, and the EC relation may be a CRC relation that may be based on a CRC polynomial and a set of polynomial division remainder values associated with the set of shaping bits. In some aspects, the set of EC bits may be a set of PC bits, and the EC relation may be a PC relation that is based on a set of linear combinations of shaping bits in the set of shaping bits. In aspects, the target distribution of the set of shaped transmission bits may be associated with a QAM constellation configuration.

In aspects, to shape (at 608) the set of transmission bits to the set of shaped transmission bits, the transmitter network device 602 may be configured to encode, to a set of encoded bits, the first set of data bits, the set of shaping bits, the second set of data bits, and the set of EC bits in accordance with the EC-polar code. In some aspects, the set of shaped transmission bits may include the set of encoded bits from an output of the EC polar code for an encoder operation, e.g., as performed by an encoder of the EC polar code. The shaping (at 608) performed by the transmitter network device 602 may include shaping the set of transmission bits to the set of shaped transmission bits in a bit domain for the set of shaped transmission bits.

With reference to FIG. 9, in aspects, a shaper, e.g., as represented by the EC polar code 902 as configured to perform shaping/de-shaping for sets of transmission bits utilizing the EC polar encoder matrix 918, may be configured, for each realization of a and a', to identify/calculate/generate/determine s and p(s) (e.g., the set of shaping bits 906 ($s=[s_0, s_1, \ldots, s_{K-1}]$) and the set of EC bits 922 ($p=[p_0, \ldots, p_{n_{pc}-1}]$)), such that the length-N vector $u=[a,a'+p,s] \cdot G$ (e.g., the codeword 912) has the desired distribution. In aspects, the set of EC bits may be generated based on an EC relation 917 associated with the set of shaping bits 906 ($s=[s_0, s_1, \ldots, s_{K-1}]$). In aspects where the set of EC bits 922 ($p=[p_0, \ldots, p_{n_{pc}-1}]$) may be a set of CRC bits, the EC relation 917 may be a CRC relation based on a CRC polynomial and a set of polynomial division remainder values associated with the set of shaping bits 906 ($s=[s_0, s_1, \ldots, s_{K-1}]$). In aspects where the set of EC bits 922 ($p=[p_0, \ldots, p_{n_{pc}-1}]$) may be a set of PC bits, the EC relation 917 may be a PC relation based on a set of linear combinations of shaping bits in the set of shaping bits 906 ($s=[s_0, s_1, \ldots, s_{K-1}]$).

In this context, the codeword 912 representation for the length-N vector may be rewritten as: $0 \cdot G_a + [p,s] \cdot G_{p,s} = [a,a'] \cdot G_{a,p} + u$, where the left hand side of the rewritten representation/equation is the EC polar code 902 (e.g., where all frozen bits are set to zero), and the left hand side of the rewritten representation/equation comprises the shaped bits $u_x$, and a scrambling sequence that may be generated from a shaped set of data bits 924: $c=[a,a'] \cdot G_{a,p}$. In such aspects, $G_{p,s}$ denotes the submatrix obtained by stacking the subset of rows in G that correspond to the information bit locations and PC bit locations 907, and Gap denotes the submatrix of G obtained by stacking the subset of rows in G that correspond to the frozen bit locations 905 and the remaining $n_{pc}$ bit locations 909 (e.g., PC bit locations).

In aspects, the set of EC bits 922 ($p=[p_0, \ldots, p_{n_{pc}-1}]$) may be computed/generated from the set of shaping bits 906 ($s=[s_0, s_1, \ldots, s_{K-1}]$) during the decoding by the decoder 916. Based on the formulation described above, the decoder 916 may be configured to decode the set of shaping bits 906 ($s=[s_0, s_1, \ldots, s_{K-1}]$) by treating the right hand side of the representation $0 \cdot G_a + [p,s] \cdot G_{p,s} = [a,a'] \cdot G_{a,p} + u$, as the received signal $c=[a,a'] \cdot G_{a,p}$ (e.g., a shaped set of data bits 924) plus some additive noise u, whose distribution is the target probability distribution for shaping by the EC polar code 902. In aspects for probabilistic shaping, the target probability distribution may be based on LLRs 926. For instance, such LLRs 926 may be set to:

$$LLR_i = (-1)^{c_i} \log \frac{p}{1-p},$$

where p denotes the probability of 0 in the target destruction. The LLRs 926 may be used as the input to the EC polar code 902 to decode the set of shaping bits 906 ($s=[s_0, s_1, \ldots, s_{K-1}]$) by the decoder 916, and from the set of shaping bits 906 ($s=[s_0, s_1, \ldots, s_{K-1}]$), the set of EC bits 922 ($p=[p_0, \ldots, p_{n_{pc}-1}]$) may be calculated using the EC encoding rule of the encoder 914.

Accordingly, the number of options for the codeword 912 available to select for shaping and subsequent transmission by a transmitter network device (e.g., the transmitter network device 602 in FIG. 6/702 in FIG. 7) in the described aspects remains as $2^K$ codewords, which is same as a standard polar code, while the minimum distance between the $2^K$ codewords (e.g., generated/available ones of the codeword 912) of the EC polar code 902 is larger than a stand polar code.

At 1206, the transmitter network device transmits, to a receiver network device, the set of shaped transmission bits. As an example, the transmission may be performed by one or more of the component 198, the transceiver(s) 1522, and/or the antenna 1580 in FIG. 15, and or may be performed by one or more of the component 199, the transceiver(s) 1646, and/or the antenna 1680 in FIG. 16. FIGS. 6, 8, 9 illustrate an example of the transmitter network device 602 transmitting such a set of shaped transmission bits to a receiver network device (e.g., the receiver network device 604).

The transmitter network device 602 may be configured to transmit, to the receiver network device 604 that may be configured to receive, the set of shaped transmission bits 610. In aspects, the set of shaped transmission bits 610 may be transmitted by the transmitter network device 602 with the target distribution associated with the QAM constellation configuration. In aspects, the transmitter network device 602 may be configured to transmit the set of shaped transmission bits associated with the EC-polar code based on an output of a channel encoder associated with the transmitter network device 602.

Figure 13:
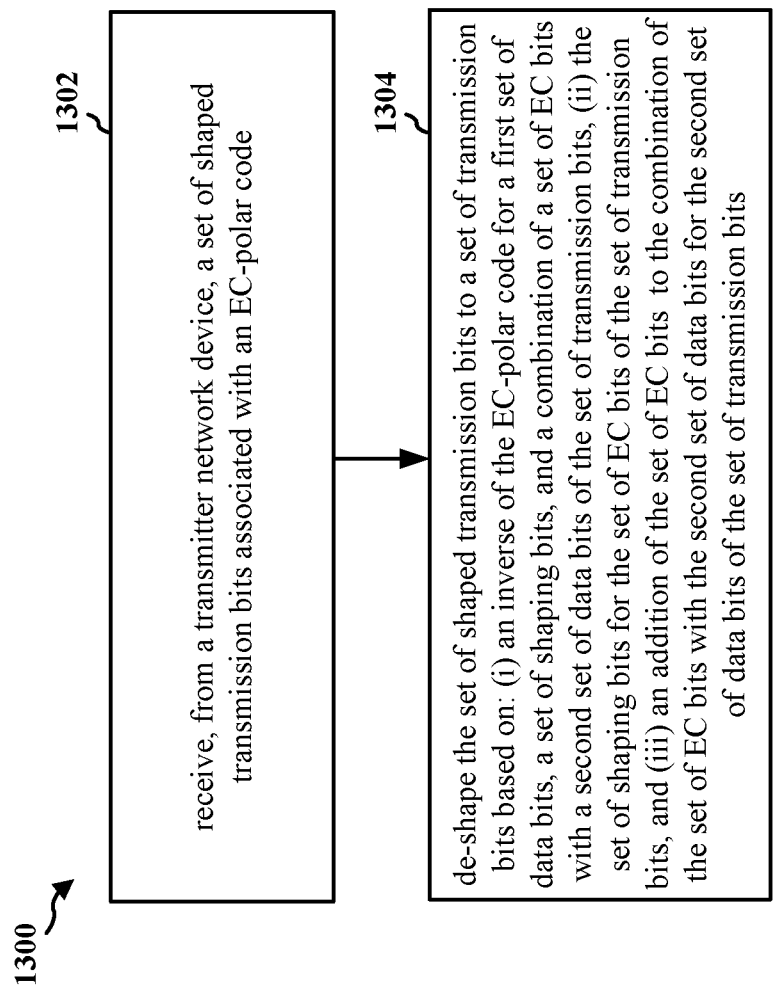
FIG. 13 is a flowchart of a method of wireless communication.

FIG. 13 is a flowchart 1300 of a method of wireless communication. The method may be performed by a receiver network device (e.g., the receiver network device 604, 704, 1004, 1054; the UE 104; the apparatus 1504; the base station 102; the network entity 1502, 1602). In some aspects, the method may include aspects described in connection with the communication flows in FIGS. 6, 7, 10, and/or aspects described in FIGS. 4, 5, 8, 9, 11. The method may be for dynamic frozen polar codes for probabilistic shaping. The method may enable maximization of shaping with $2^k$ codewords (where k is the number of shaping bits) as in other polar code solutions, as well as improvements/increases in the minimum distance between the codewords over other polar code solutions by mapping bit of a data payload to be transformed by an EC-polar code using a super-position or XOR of a set of data bits of the payload with EC bits.

At 1302, the receiver network device receives, from a transmitter network device, a set of shaped transmission bits associated with an EC-polar code. As an example, the reception may be performed by one or more of the component 198, the transceiver(s) 1522, and/or the antenna 1580 in FIG. 15, and or may be performed by one or more of the component 199, the transceiver(s) 1646, and/or the antenna 1680 in FIG. 16. FIGS. 7, 8, 9 illustrate an example of the receiver network device 704 receiving such a set of shaped transmission bits associated with an EC-polar code from a transmitter network device (e.g., the transmitter network device 702).

The receiver network device 704 may be configured to receive, from the transmitter network device 702 that may be configured to transmit, a set of shaped transmission bits 706 associated with an EC-polar code. In aspects, the set of shaped transmission bits 706 may be transmitted by the transmitter network device 702, and received by the receiver network device 704, with a target distribution associated with the QAM constellation configuration. In aspects, the receiver network device 704 may be configured to receive the set of shaped transmission bits associated with the EC-polar code based on an output of a channel decoder associated with the receiver network device 704.

At 1304, the receiver network device de-shapes the set of shaped transmission bits to a set of transmission bits based on: (i) an inverse of the EC-polar code for a first set of data bits, a set of shaping bits, and a combination of a set of EC bits with a second set of data bits of the set of transmission bits, (ii) the set of shaping bits for the set of EC bits of the set of transmission bits, and (iii) a subtraction of the set of EC bits from the combination of the set of EC bits with the second set of data bits for the second set of data bits of the set of transmission bits. As an example, the de-shaping may be performed by one or more of the component 198, the transceiver(s) 1522, and/or the antenna 1580 in FIG. 15, and or may be performed by one or more of the component 199, the transceiver(s) 1646, and/or the antenna 1680 in FIG. 16. FIGS. 6, 8, 9 illustrate an example of the receiver network device 704 de-shaping such a set of shaped transmission bits to a set of transmission bits.

The receiver network device 704 may be configured to de-shape (at 708) the set of shaped transmission bits to a set of transmission bits. To de-shape (at 708) the set of shaped transmission bits to a set of transmission bits, the receiver network device 704 may be configured to de-shape (at 708) based on (i) an inverse of the EC-polar code for a first set of data bits, a set of shaping bits, and a combination of a set of EC bits with a second set of data bits of the set of transmission bits. To de-shape (at 708) the set of shaped transmission bits to a set of transmission bits, the receiver network device 704 may be configured to de-shape (at 708) based on (ii) the set of shaping bits for the set of EC bits of the set of transmission bits. To de-shape (at 708) the set of shaped transmission bits to a set of transmission bits, the receiver network device 704 may be configured to de-shape (at 708) based on (iii) a subtraction of the set of EC bits from the combination of the set of EC bits with the second set of data bits for the second set of data bits of the set of transmission bits.

In aspects, de-shaping (at 708) by the receiver network device 704 for the set of shaped transmission bits to the set of transmission bits based on (i) the inverse of the EC-polar code may include the receiver network device 704 being configured to identify the first set of data bits, the set of shaping bits, and the combination of the set of EC bits with the second set of data bits by an application of the inverse of the EC-polar code to the set of shaped transmission bits. In aspects, de-shaping (at 708) by the receiver network device 704 for the set of shaped transmission bits to the set of transmission bits based on (ii) the set of shaping bits for the set of EC bits of the set of transmission bits may include the receiver network device 704 being configured to generate the set of EC bits based on an EC relation associated with the set of shaping bits. The set of EC bits may be a set of CRC bits, and the EC relation may be a CRC relation based on a CRC polynomial and a set of polynomial division remainder values associated with the set of shaping bits. The set of EC bits may be a set of PC bits, and the EC relation may be a PC relation based on a set of linear combinations of shaping bits in the set of shaping bits. In aspects, the combination of the set of EC bits with the second set of data bits may be associated with an addition operation thereon/a super-position therebetween.

The de-shaping (at 708) of the set of shaped transmission bits to the set of transmission bits may be performed in a bit domain for the set of shaped transmission bits In aspects, de-shaping (at 708) by the receiver network device 704 for the set of shaped transmission bits to the set of transmission bits based on (iii) a subtraction of the set of EC bits from the combination of the set of EC bits with the second set of data bits may include the receiver network device 704 being configured to add the set of EC bits to the combination of the set of EC bits with the second set of data bits in a bit domain addition operation.

With reference to FIG. 9, and in the context of receiving such a shaped transmission by a receiver network device (e.g., the receiver network device 604 in FIG. 6/704 in FIG. 7), the EC polar code 902 may be configured to operate as a de-shaper for the shaped transmission in a manner, according to aspects herein, that is different from a standard polar codes.

In aspects, after reception of the transmitted data, described above, the receiver network device may be configured to obtain the codeword 912 ($u$) using its channel decoder. The relation u=[a,a'+p,s]·G, as described herein, may be used to recover the portion [a,a'+p,s] utilizing/by application of an inverse matrix 928 of the EC polar encoder matrix 918 of the EC polar code 902, where the inverse matrix 928 uG$^{-1}$=uG. Accordingly, the EC polar code 902 may be configured to extract/obtain the set of shaping bits 906 ($s=[s_0, s_1, \ldots, s_{K-1}]$) and the first set of data bits 904 ($a=[a_0, \ldots a_{N-K-n_{pc}-1}]$) from the codeword 912 ($u$). From the set of shaping bits 906 ($s=[s_0, s_1, \ldots, s_{K-1}]$), the EC polar code 902 may be configured to calculate/obtain the set of EC bits 922 ($p=[p_0, \ldots, p_{n_{PC}-1}]$) based on the EC relation 917, as described above. The EC polar code 902 may also be configured to calculate/obtain the second set of data bits 920 (a'=[a'$_0$, a'$_1$, . . . , a'$_{n_{pc}-1}$]). In aspects, the EC polar code 902 may be configured to perform an addition operation 930 to calculate/obtain the second set of data bits 920 (a'=[a'$_0$, a'$_1$, . . . , a'$_{n_{pc}-1}$]) from the combination of bits 908 (*d*) (e.g., [a'+p]) and the set of EC bits 922 (p=[p$_0$, . . . , p$_{n_{PC}-1}$]). In one example, the addition operation may be represented by: a'=(a'+p)+p. In aspects, one or more of the above operations may be performed in the bit domain and can be performed with minimal complexity. The aspects described above may also be applicable to arbitrary PC/dynamic frozen polar codes, regardless of length of PC/dynamic frozen bits, and the PC/dynamic frozen constraint.

Figure 14:
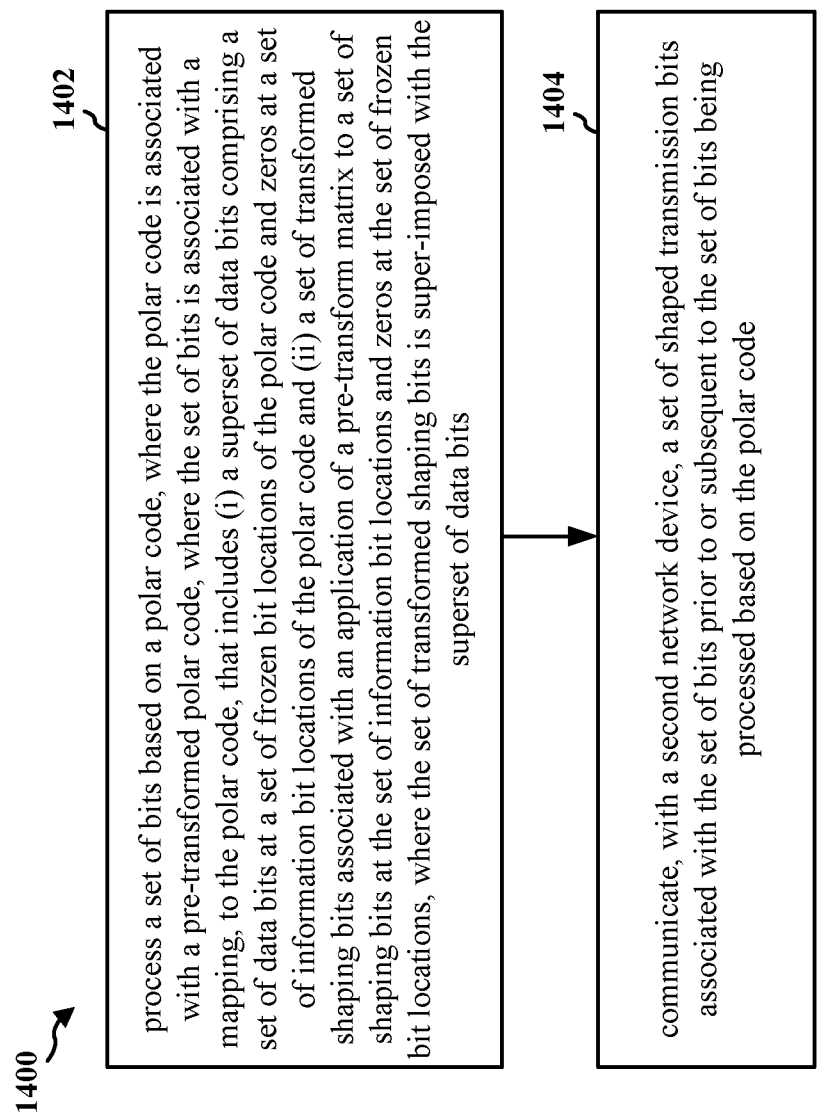
FIG. 14 is a flowchart of a method of wireless communication.

FIG. 14 is a flowchart 1400 of a method of wireless communication. The method may be performed by a first network device (e.g., the transmitter network device 602, 702, 1002, 1052; the receiver network device 604, 704, 1004, 1054; the UE 104; the apparatus 1504; the base station 102; the network entity 1502, 1602). In some aspects, the method may include aspects described in connection with the communication flows in FIGS. 6, 7, 10, and/or aspects described in FIGS. 4, 5, 8, 9, 11. The method may be for dynamic frozen polar codes for probabilistic shaping. The method may enable maximization of shaping with $2^k$ codewords (where k is the number of shaping bits) as in other polar code solutions, as well as improvements/increases in the minimum distance between the codewords over other polar code solutions by mapping bit of a data payload to be transformed by an EC-polar code using a super-position or XOR of a set of data bits of the payload with EC bits.

At 1402, the first network device processes a set of bits based on a polar code, where the polar code is associated with a pre-transformed polar code, where the set of bits is associated with a mapping, to the polar code, that includes (i) a superset of data bits comprising a set of data bits at a set of frozen bit locations of the polar code and zeros at a set of information bit locations of the polar code and (ii) a set of transformed shaping bits associated with an application of a pre-transform matrix to a set of shaping bits at the set of information bit locations and zeros at the set of frozen bit locations, where the set of transformed shaping bits is super-imposed with the superset of data bits. As an example, the processing may be performed by one or more of the component 198, the transceiver(s) 1522, and/or the antenna 1580 in FIG. 15, and or may be performed by one or more of the component 199, the transceiver(s) 1646, and/or the antenna 1680 in FIG. 16. FIGS. 10, 11 illustrate an example of the first network device (e.g., the transmitter network device 1002 and/or the receiver network device 1054) processing such a set of bits based on a polar code.

The first network device (e.g., the transmitter network device 1002 or the receiver network device 1054) may be configured to process (at 1006) a set of bits based on a polar code. The polar code may be associated with at least one of a PAC code or a pre-transformed polar code, and the set of bits may be associated with a mapping to the polar code. The mapping may include (i) a superset of data bits comprising a set of data bits at a set of frozen bit locations of the polar code and zeros at a set of information bit locations of the polar code and (ii) a set of transformed shaping bits associated with an application of an upper-triangular matrix to a set of shaping bits at the set of information bit locations and zeros at the set of frozen bit locations. In aspects, the upper-triangular matrix may include a set of diagonal elements equal to one, and the set of transformed shaping bits may be super-imposed with the superset of data bits (e.g., a super-position).

In aspects where the first network device is the transmitter network device 1002, and the second network device is the receiver network device 1004, the first network device, to process (at 1006) the set of bits based on the polar code, may be configured to shape the set of data bits to the set of shaped transmission bits based on the mapping and the polar code. The first network device may be configured, for the shaping, to generate the set of shaping bits based on the target distribution and a decoder associated with the EC polar code. In aspects, the set of shaping bits may be generated based on a set of LLRs/probabilities associated with a target distribution of the set of shaped transmission bits and the decoder of the polar code. The first network device may be configured, for the shaping to, encode, to a set of encoded bits, the set of data bits and the set of transformed shaping bits in accordance with the polar code. The set of shaped transmission bits may include the set of encoded bits from an output of the polar code for an encoder operation.

In aspects where the first network device is the receiver network device 1054, and the second network device is the transmitter network device 1052, the first network device, to process (at 1006) the set of bits based on the polar code, may be configured to de-shape the set of shaped transmission bits 1008 to the set of data bits based on the mapping and an inverse of the polar code. In aspects, to de-shape the set of shaped transmission bits 1008 to the set of data bits based on the mapping and the inverse of the polar code, the first network device may be configured to identify a transformed shaping bit subset of the set of transformed shaping bits as being zeros based on the transformed shaping bit subset being located before a first shaping bit at a first information bit location of the set of information bit locations. In aspects, to de-shape the set of shaped transmission bits 1008 to the set of data bits based on the mapping and the inverse of the polar code, the first network device may be configured to identify a bit subset of the superset of data bits based on the inverse of the polar code and the transformed shaping bit subset being zeros.

With reference to FIG. 11, diagram 1100 shows a polar encoder matrix 1118 (G) and an associated input bit configuration that may be utilized for a PAC code/a pre-transformed polar code (e.g., a polar code 1102, by way of example), with an encoder 1114, a decoder 1116, and an associated multi-diagonal matrix 1124 (e.g., an upper-triangle matrix), for probabilistic shaping. The generalization of PAC/pre-transformed polar codes for shaping is now described.

With reference to a PAC code/a pre-transformed polar code generally (e.g., the polar code 1102), an upper triangular matrix T (e.g., the multi-diagonal matrix 1124) may be multiplied with the frozen and information bits, prior to applying the polarization transform, e.g., the polar encoder matrix 1118 (G) of the polar code 1102, where $$G = \begin{bmatrix} 1 & 0 \\ 1 & 1 \end{bmatrix}^{\otimes m},$$

and the diagonal elements 1126 of the upper-triangular matrix 1124 (e.g., T ($t_{jj}$)) are one ('1'), in aspects. In aspects, a set of information bit locations 1128 and a set of frozen bit locations 1130 are denoted by $Q_1$, and $Q_N$, respectively.

In aspects, information bits to be transmitted in a shaped codeword (e.g., a codeword 1112) may be associated with a set of data bits 1104 (a=[a$_0$, . . . a$_{N-K-1}$]) and or a set of shaping bits 1106 (s=[s$_0$, s$_1$, . . . , S$_{K-1}$]), which may be determined from the set of data bits 1104 ($a$). A super-position 1108 between the set of data bits 1104 and the set of shaping bits 1106 may be utilized to achieve shaping with an available number $2^K$ of the codeword 1112 and advantageous minimum distances therebetween.

In this context, a superset of data bits 1105 ($\tilde{a}$) may be a length N vector in which the set of data bits 1104 ($a=[a_0, \ldots a_{N-K-1}]$) are mapped to/placed in the set of frozen bit locations 1130 ($Q_N$) of the polar code 1102, and 0's (zeros) are mapped to/placed in the set of information bit locations 1128 ($Q_I$) of the polar code 1102. For shaping bits, a set of shaping bits 1107 ($\tilde{s}$) may be a length N vector associated with the set of shaping bits 1106 ($s=[s_0, s_1, \ldots, s_{K-1}]$), in which the set of shaping bits 1106 ($s=[s_0, s_1, \ldots, s_{K-1}]$) are mapped to/placed in the set of information bit locations 1128 ($Q_I$) of the polar code 1102, and 0's (zeros) are mapped to/placed in the set of frozen bit locations 1130 ($Q_N$) of the polar code 1102. The set of shaping bits 1107 ($\tilde{s}$) may further be associated with an application of an upper-triangular matrix (e.g., the upper-triangular matrix 1124) to generate a set of pre-transformed shaping bits ($\tilde{s} \cdot T$).

The set of shaped bits 1110 (e.g., the codeword 1112) may be generated according to the relation ($\tilde{s} \cdot T + \tilde{a}) \cdot G = u$, which may be represented as the relation ($\tilde{s} \cdot T) = \tilde{a} \cdot G + u$, where the upper-triangular matrix 1124 (T) is applied to the set of shaping bits 1107 ($\tilde{s}$) but not to the superset of data bits 1105 ($\tilde{a}$), which are super-imposed with the set of pre-transformed shaping bits ($\tilde{s} \cdot T$).

At the Tx side, e.g., for a transmitter network device, such a device may be configured to perform similar steps, as in the EC polar code aspects described above for FIG. 9, by initializing an LLR 1122 as:

$$LLR_i = (-1)^{c_i} \log \frac{p}{1-p},$$

where: $c_i$ denotes the ith element of a vector c (e.g., a shaped set of data bits 1120), where: $c = \tilde{a}G$, and the PAC/pre-transformed polar code elements are denoted as: $\tilde{s} \cdot T \cdot G$. In some aspects, as noted above, a probability (p) may be utilized in place of the LLR 1122, and the decoder 1116 may receive the probability (p) when $c_i = 0$ and ($1-p$) when $c_i = 1$.

Referring back to FIG. 10, in aspects, to de-shape the set of shaped transmission bits 1008 to the set of data bits based on the mapping and the inverse of the polar code, the first network device may also be configured to, for each transformed shaping bit of the set of transformed shaping bits after the transformed shaping bit subset, identify the transformed shaping bit as being zero if the transformed shaping bit is in a frozen bit location of the set of frozen bit locations, and identify a corresponding bit of the superset of data bits, which corresponds via a first super-position with the transformed shaping bit, based on the inverse of the polar code, a corresponding element of the upper-triangular matrix, and the transformed shaping bit being zero. In aspects, to de-shape the set of shaped transmission bits 1008 to the set of data bits based on the mapping and the inverse of the polar code, the first network device may also be configured to, for each bit of the superset of data bits after the bit subset, identify the bit as being zero if the bit is in an information bit location of the set of information bit locations, and identify a corresponding transformed shaping bit of the set of transformed shaping bits, which corresponds via a second super-position with the bit, based on the inverse of the polar code, the corresponding element of the upper-triangular matrix, and the bit being zero.

With again reference to FIG. 11 and diagram 1100, at the Rx side, e.g., for a receiver network device, the polar code 1102 may be configured to obtain the codeword 1112 (u, which may be generated according to the relation ($\tilde{s} \cdot T + \tilde{a}) \cdot G = u$) from a channel decoder. According to aspects, the polar code 1102 may be configured to recover the superset of data bits 1105 ($\tilde{a}$) from the codeword 1112 ($u$), and in doing so, the polar code 1102 may be configured to separate the superset of data bits 1105 ($\tilde{a}$) and the set of shaping bits 1107 ($\tilde{s}$), as associated with the application of the upper-triangular matrix 1124 (e.g., $\tilde{s} \cdot T$, a set of pre-transformed shaping bits), in accordance with the sum: $\tilde{s} \cdot T + \tilde{a} = u \cdot G^{-1}$. In aspects, the jth element in each of the vector $\tilde{s} \cdot T$, the vector $\tilde{a}$, and the vector $u \cdot G^{-1}$, may be represented as $h_j$, $\tilde{a}_j$, $u_j$, respectively. However, due to the construction described above, $\tilde{s} \cdot T$ may occupy both of the information bit locations 1128 and the frozen bit locations 1130, and are thus super-imposed with the superset of data bits 1105 ($\tilde{a}$) (or more specifically, with the set of data bits 1104 ($a$). Yet, the aspects herein enable utilization of the upper-triangular matrix 1124 (T) being an upper triangular matrix with diagonal $t_{jj} = 1$. Accordingly, aspects provide for the jth bit $h_j$ in the vector $\tilde{s} \cdot T$ to depend on the first j bits of the set of transformed shaping bits 1107 ($\tilde{s}$), while not depending on other bits.

In aspects, each of the bits in the set of transformed shaping bits 1107 ($\tilde{s}$) before the first shaping bit may be zero (e.g., the first L bits), and therefore, the corresponding first L bits in the vector $\tilde{s} \cdot T$ are also zero. In accordance with this relation, the first L bits of the superset of data bits 1105 ($\tilde{a}$) may be recovered as the first L bits for an application of the inverse of the polar code 1102 with the codeword 1112: $u \cdot G^{-1}$, where $G^{-1}$ is the inverse.

For the first shaping bits '$s_0$' in the set of transformed shaping bits 1107 ($\tilde{s}$), the corresponding location in the superset of data bits 1105 ($\tilde{a}$) is a 0 (zero), and thus, the polar code 1102 may be configured to obtain $s_0$ from $u \cdot G^{-1}$. For all bits after the first shaping bits, e.g., bit $\tilde{s}_j$, if the corresponding location is a frozen bit, then $\tilde{s}_j = 0$, and the polar code 1102 may be configured to calculate $$h_j = \sum_{k=0}^{j-1} \tilde{s}_k t_{kj}$$

from the shaping bits up to $j-1$, and then to obtain the data bits $\tilde{a}_j = u_j - h_j$. If the corresponding location is an information bit location, then $\tilde{a}_j = 0$, and therefore, $h_j = u_j$. Then, the polar code 1102 may be configured to recover $$\tilde{s}_J = h_j = \sum_{k=0}^{j-1} \tilde{s}_k t_{kj}$$

from all previously determined $\tilde{s}_k$'s for $0 \leq k < j$. The aspects described above may be performed sequentially, until all data bits in in the superset of data bits 1105 ($\tilde{a}$) are obtained via separation of in the superset of data bits 1105 ($\tilde{a}$) from the sum $\tilde{s} \cdot T + \tilde{a}$ by exploiting the upper-triangular nature of the upper-triangular matrix 1124 (T).

At 1404, the first network device communicates, with a second network device, a set of shaped transmission bits associated with the set of bits prior to or subsequent to the set of bits being processed based on the polar code. As an example, the communication may be performed by one or more of the component 198, the transceiver(s) 1522, and/or the antenna 1580 in FIG. 15, and or may be performed by one or more of the component 199, the transceiver(s) 1646, and/or the antenna 1680 in FIG. 16. FIGS. 10, 11 illustrate an example of the first network device (e.g., the transmitter network device 1002 and/or the receiver network device 1054) communicating such a set of shaped with a second network device (e.g., the receiver network device 1004 and/or the transmitter network device 1052).

The first network device may be configured to communicate, with the second network device, a set of shaped transmission bits 1008 associated with the set of bits prior to or subsequent to processing (at 1006) the set of bits based on the polar code. In aspects where the first network device is the transmitter network device 1002, and the second network device is the receiver network device 1004, the first network device may be configured to transmit the set of shaped transmission bits 1008 to the receiver (second) network device subsequent to processing (at 1006) the set of bits based on the polar code. In aspects where the first network device is the receiver network device 1054, and the second network device is the transmitter network device 1052, the first network device the first network device may be configured to receive the set of shaped transmission bits 1008 from the transmitter (second) network device prior to processing (at 1006) the set of bits based on the polar code.

Figure 15:
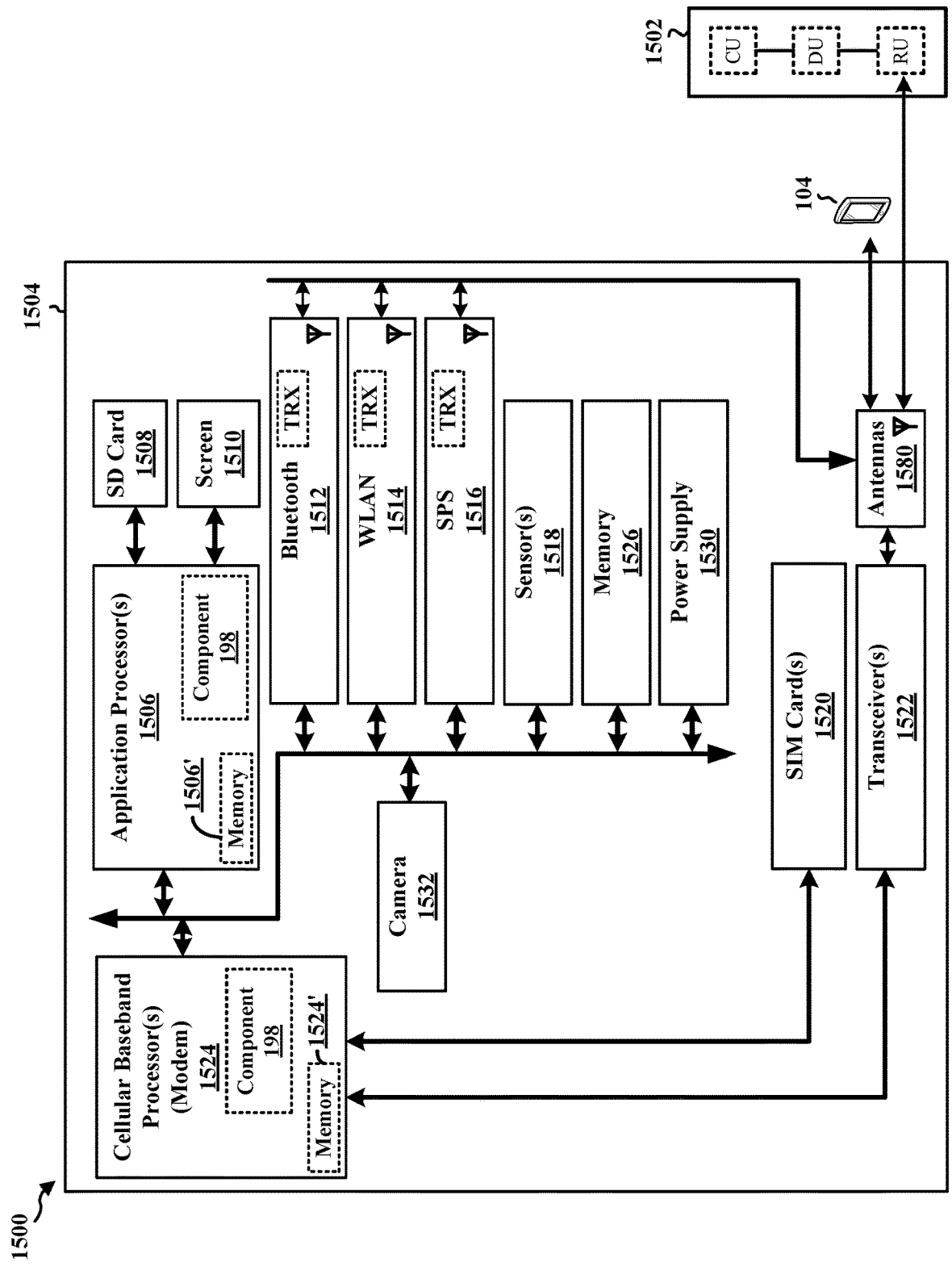
FIG. 15 is a diagram illustrating an example of a hardware implementation for an example apparatus and/or network entity.

FIG. 15 is a diagram 1500 illustrating an example of a hardware implementation for an apparatus 1504. The apparatus 1504 may be a UE, a component of a UE, or may implement UE functionality. In some aspects, the apparatus 1504 may include at least one cellular baseband processor 1524 (also referred to as a modem) coupled to one or more transceivers 1522 (e.g., cellular RF transceiver). The cellular baseband processor(s) 1524 may include at least one on-chip memory 1524'. In some aspects, the apparatus 1504 may further include one or more subscriber identity modules (SIM) cards 1520 and at least one application processor 1506 coupled to a secure digital (SD) card 1508 and a screen 1510. The application processor(s) 1506 may include on-chip memory 1506'. In some aspects, the apparatus 1504 may further include a Bluetooth module 1512, a WLAN module 1514, an SPS module 1516 (e.g., GNSS module), one or more sensor modules 1518 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1526, a power supply 1530, and/or a camera 1532. The Bluetooth module 1512, the WLAN module 1514, and the SPS module 1516 may include an on-chip transceiver (TRX) (or in some cases, just a receiver (RX)). The Bluetooth module 1512, the WLAN module 1514, and the SPS module 1516 may include their own dedicated antennas and/or utilize the antennas 1580 for communication. The cellular baseband processor(s) 1524 communicates through the transceiver(s) 1522 via one or more antennas 1580 with the UE 104 and/or with an RU associated with a network entity 1502. The cellular baseband processor(s) 1524 and the application processor(s) 1506 may each include a computer-readable medium/memory 1524', 1506', respectively. The additional memory modules 1526 may also be considered a computer-readable medium/memory. Each computer-readable medium/memory 1524', 1506', 1526 may be non-transitory. The cellular baseband processor(s) 1524 and the application processor(s) 1506 are each responsible for general processing, including the execution of software stored on the computer-readable medium/memory. The software, when executed by the cellular baseband processor(s) 1524/application processor(s) 1506, causes the cellular baseband processor(s) 1524/application processor(s) 1506 to perform the various functions described supra. The cellular baseband processor(s) 1524 and the application processor(s) 1506 are configured to perform the various functions described supra based at least in part of the information stored in the memory. That is, the cellular baseband processor(s) 1524 and the application processor(s) 1506 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1524/application processor(s) 1506 when executing software. The cellular baseband processor(s) 1524/application processor(s) 1506 may be a component of the UE 350 and may include the at least one memory 360 and/or at least one of the TX processor 368, the RX processor 356, and the controller/processor 359. In one configuration, the apparatus 1504 may be at least one processor chip (modem and/or application) and include just the cellular baseband processor(s) 1524 and/or the application processor(s) 1506, and in another configuration, the apparatus 1504 may be the entire UE (e.g., see UE 350 of FIG. 3) and include the additional modules of the apparatus 1504.

As discussed supra, the component 198 may be configured to map a set of transmission bits to an EC-polar code, where the set of transmission bits includes a first set of data bits, a second set of data bits, a set of EC bits, and a set of shaping bits, where the first set of data bits corresponds to a set of frozen bit locations of the EC-polar code, the set of shaping bits corresponds to a set of information bit locations of the EC-polar code, and the set of EC bits and the second set of data bits both correspond to a set of remaining locations of the EC-polar code. The component 198 may be configured to shape the set of transmission bits to a set of shaped transmission bits based on the mapping, the EC-polar code, and an addition operation on the set of transmission bits including the set of EC bits and the second set of data bits. The component 198 may be configured to transmit, to a receiver network device, the set of shaped transmission bits. The component 198 may be configured to receive, from a transmitter network device, a set of shaped transmission bits associated with an EC-polar code. The component 198 may be configured to de-shape the set of shaped transmission bits to a set of transmission bits based on: (i) an inverse of the EC-polar code for a first set of data bits, a set of shaping bits, and a combination of a set of EC bits with a second set of data bits of the set of transmission bits, (ii) the set of shaping bits for the set of EC bits of the set of transmission bits, and (iii) a subtraction of the set of EC bits from the combination of the set of EC bits with the second set of data bits for the second set of data bits of the set of transmission bits. The component 198 may be configured to process a set of bits based on a polar code, where the polar code is associated with a pre-transformed polar code, where the set of bits is associated with a mapping, to the polar code, that includes (i) a superset of data bits comprising a set of data bits at a set of frozen bit locations of the polar code and zeros at a set of information bit locations of the polar code and (ii) a set of transformed shaping bits associated with an application of a pre-transform matrix to a set of shaping bits at the set of information bit locations and zeros at the set of frozen bit locations, where the set of transformed shaping bits is super-imposed with the superset of data bits. The component 198 may be configured to communicate, with a second network device, a set of shaped transmission bits associated with the set of bits prior to or subsequent to the set of bits being processed based on the polar code. The component 198 may be further configured to perform any of the aspects described in connection with the flowcharts in any of FIGS. 12, 13, 14, and/or any of the aspects performed by a transmitter network device (e.g., a UE, a network node/entity, etc.) for any of FIGS. 4-11. The component 198 may be within the cellular baseband processor(s) 1524, the application processor(s) 1506, or both the cellular baseband processor(s) 1524 and the application processor(s) 1506. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1504 may include a variety of components configured for various functions. In one configuration, the apparatus 1504, and in particular the cellular baseband processor(s) 1524 and/or the application processor(s) 1506, may include means for mapping a set of transmission bits to an EC-polar code. The set of transmission bits includes a first set of data bits, a second set of data bits, a set of EC bits, and a set of shaping bits, where the first set of data bits corresponds to a set of frozen bit locations of the EC-polar code, the set of shaping bits corresponds to a set of information bit locations of the EC-polar code, and the set of EC bits and the second set of data bits both correspond to a set of remaining locations of the EC-polar code. In one configuration, the apparatus 1504, and in particular the cellular baseband processor(s) 1524 and/or the application processor(s) 1506, may include means for shaping the set of transmission bits to a set of shaped transmission bits based on the mapping, the EC-polar code, and an addition operation on the set of transmission bits including the set of EC bits and the second set of data bits. In one configuration, the apparatus 1504, and in particular the cellular baseband processor(s) 1524 and/or the application processor(s) 1506, may include means for transmitting, to a receiver network device, the set of shaped transmission bits. In one configuration, the apparatus 1504, and in particular the cellular baseband processor(s) 1524 and/or the application processor(s) 1506, may include means for receiving, from a transmitter network device, a set of shaped transmission bits associated with an EC-polar code. In one configuration, the apparatus 1504, and in particular the cellular baseband processor(s) 1524 and/or the application processor(s) 1506, may include means for de-shaping the set of shaped transmission bits to a set of transmission bits based on: (i) an inverse of the EC-polar code for a first set of data bits, a set of shaping bits, and a combination of a set of EC bits with a second set of data bits of the set of transmission bits, (ii) the set of shaping bits for the set of EC bits of the set of transmission bits, and (iii) a subtraction of the set of EC bits from the combination of the set of EC bits with the second set of data bits for the second set of data bits of the set of transmission bits. In one configuration, the apparatus 1504, and in particular the cellular baseband processor(s) 1524 and/or the application processor(s) 1506, may include means for processing a set of bits based on a polar code, where the polar code is associated with a pre-transformed polar code, where the set of bits is associated with a mapping, to the polar code, that includes (i) a superset of data bits comprising a set of data bits at a set of frozen bit locations of the polar code and zeros at a set of information bit locations of the polar code and (ii) a set of transformed shaping bits associated with an application of a pre-transform matrix to a set of shaping bits at the set of information bit locations and zeros at the set of frozen bit locations, where the set of transformed shaping bits is super-imposed with the superset of data bits. In one configuration, the apparatus 1504, and in particular the cellular baseband processor(s) 1524 and/or the application processor(s) 1506, may include means for communicating, with a second network device, a set of shaped transmission bits associated with the set of bits prior to or subsequent to the set of bits being processed based on the polar code. The means may be the component 198 of the apparatus 1504 configured to perform the functions recited by the means. As described supra, the apparatus 1504 may include the TX processor 368, the RX processor 356, and the controller/processor 359. As such, in one configuration, the means may be the TX processor 368, the RX processor 356, and/or the controller/processor 359 configured to perform the functions recited by the means.

Figure 16:
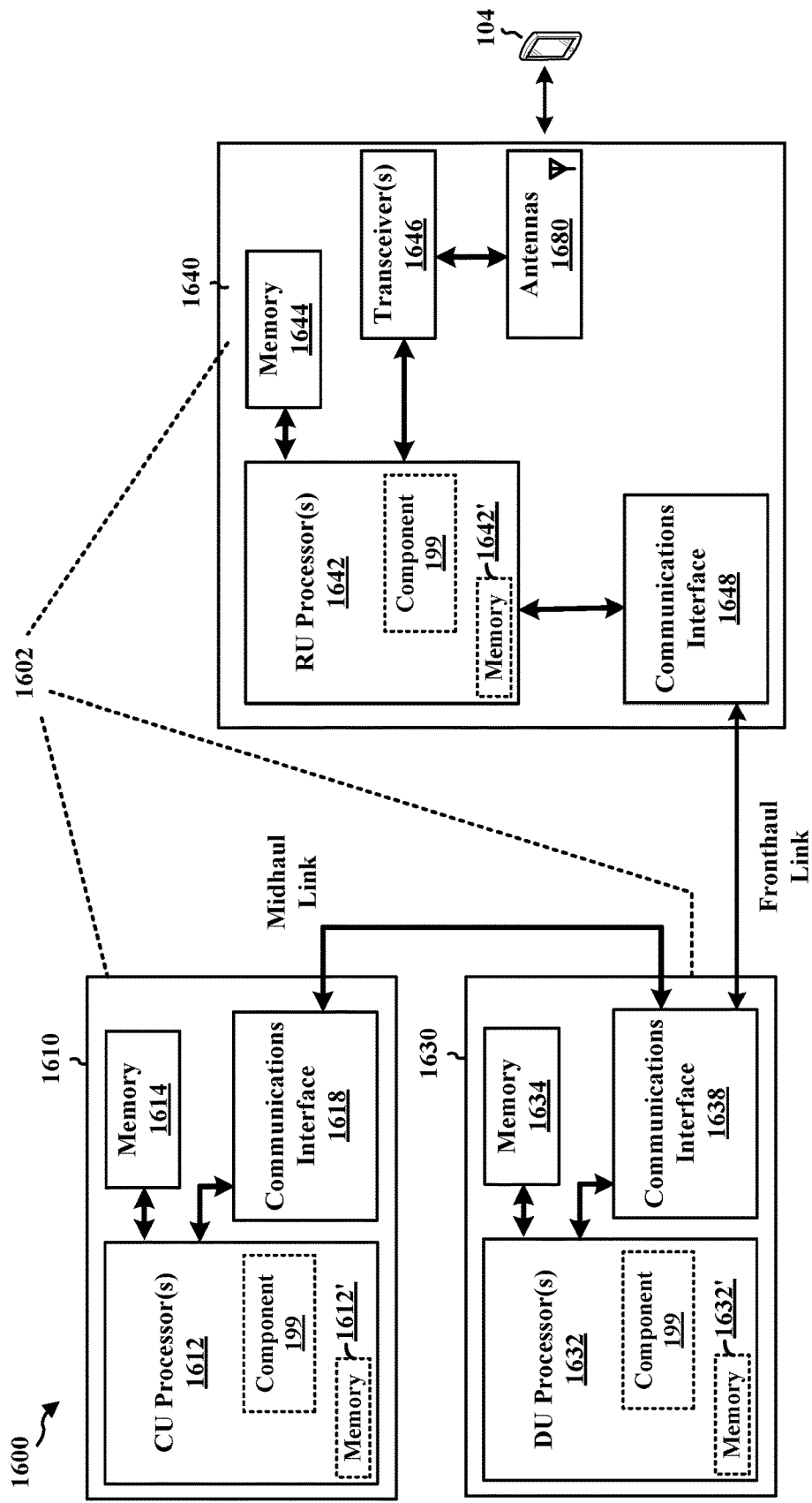
FIG. 16 is a diagram illustrating an example of a hardware implementation for an example network entity.

FIG. 16 is a diagram 1600 illustrating an example of a hardware implementation for a network entity 1602. The network entity 1602 may be a BS, a component of a BS, or may implement BS functionality. The network entity 1602 may include at least one of a CU 1610, a DU 1630, or an RU 1640. For example, depending on the layer functionality handled by the component 199, the network entity 1602 may include the CU 1610; both the CU 1610 and the DU 1630; each of the CU 1610, the DU 1630, and the RU 1640; the DU 1630; both the DU 1630 and the RU 1640; or the RU 1640. The CU 1610 may include at least one CU processor 1612. The CU processor(s) 1612 may include on-chip memory 1612'. In some aspects, the CU 1610 may further include additional memory modules 1614 and a communications interface 1618. The CU 1610 communicates with the DU 1630 through a midhaul link, such as an F1 interface. The DU 1630 may include at least one DU processor 1632. The DU processor(s) 1632 may include on-chip memory 1632'. In some aspects, the DU 1630 may further include additional memory modules 1634 and a communications interface 1638. The DU 1630 communicates with the RU 1640 through a fronthaul link. The RU 1640 may include at least one RU processor 1642. The RU processor(s) 1642 may include on-chip memory 1642'. In some aspects, the RU 1640 may further include additional memory modules 1644, one or more transceivers 1646, antennas 1680, and a communications interface 1648. The RU 1640 communicates with the UE 104. The on-chip memory 1612', 1632', 1642' and the additional memory modules 1614, 1634, 1644 may each be considered a computer-readable medium/memory. Each computer-readable medium/memory may be non-transitory. Each of the processors 1612, 1632, 1642 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to map a set of transmission bits to an EC-polar code, where the set of transmission bits includes a first set of data bits, a second set of data bits, a set of EC bits, and a set of shaping bits, where the first set of data bits corresponds to a set of frozen bit locations of the EC-polar code, the set of shaping bits corresponds to a set of information bit locations of the EC-polar code, and the set of EC bits and the second set of data bits both correspond to a set of remaining locations of the EC-polar code. The component 199 may be configured to shape the set of transmission bits to a set of shaped transmission bits based on the mapping, the EC-polar code, and an addition operation on the set of transmission bits including the set of EC bits and the second set of data bits. The component 199 may be configured to transmit, to a receiver network device, the set of shaped transmission bits. The component 199 may be configured to receive, from a transmitter network device, a set of shaped transmission bits associated with an EC-polar code. The component 199 may be configured to de-shape the set of shaped transmission bits to a set of transmission bits based on: (i) an inverse of the EC-polar code for a first set of data bits, a set of shaping bits, and a combination of a set of EC bits with a second set of data bits of the set of transmission bits, (ii) the set of shaping bits for the set of EC bits of the set of transmission bits, and (iii) a subtraction of the set of EC bits from the combination of the set of EC bits with the second set of data bits for the second set of data bits of the set of transmission bits. The component 199 may be configured to process a set of bits based on a polar code, where the polar code is associated with a pre-transformed polar code, where the set of bits is associated with a mapping, to the polar code, that includes (i) a superset of data bits comprising a set of data bits at a set of frozen bit locations of the polar code and zeros at a set of information bit locations of the polar code and (ii) a set of transformed shaping bits associated with an application of a pre-transform matrix to a set of shaping bits at the set of information bit locations and zeros at the set of frozen bit locations, where the set of transformed shaping bits is super-imposed with the superset of data bits. The component 199 may be configured to communicate, with a second network device, a set of shaped transmission bits associated with the set of bits prior to or subsequent to the set of bits being processed based on the polar code. The component 199 may be further configured to perform any of the aspects described in connection with the flowcharts in any of FIGS. 12, 13, 14, and/or any of the aspects performed by a receiver network device (e.g., a UE, a network node/entity, etc.) for any of FIGS. 4-11. The component 199 may be within one or more processors of one or more of the CU 1610, DU 1630, and the RU 1640. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1602 may include a variety of components configured for various functions. In one configuration, the network entity 1602 may include means for mapping a set of transmission bits to an EC-polar code. The set of transmission bits includes a first set of data bits, a second set of data bits, a set of EC bits, and a set of shaping bits, where the first set of data bits corresponds to a set of frozen bit locations of the EC-polar code, the set of shaping bits corresponds to a set of information bit locations of the EC-polar code, and the set of EC bits and the second set of data bits both correspond to a set of remaining locations of the EC-polar code. The network entity 1602 may include a variety of components configured for various functions. In one configuration, the network entity 1602 may include means for shaping the set of transmission bits to a set of shaped transmission bits based on the mapping, the EC-polar code, and an addition operation on the set of transmission bits including the set of EC bits and the second set of data bits. The network entity 1602 may include a variety of components configured for various functions. In one configuration, the network entity 1602 may include means for transmitting, to a receiver network device, the set of shaped transmission bits. The network entity 1602 may include a variety of components configured for various functions. In one configuration, the network entity 1602 may include means for receiving, from a transmitter network device, a set of shaped transmission bits associated with an EC-polar code. The network entity 1602 may include a variety of components configured for various functions. In one configuration, the network entity 1602 may include means for de-shaping the set of shaped transmission bits to a set of transmission bits based on: (i) an inverse of the EC-polar code for a first set of data bits, a set of shaping bits, and a combination of a set of EC bits with a second set of data bits of the set of transmission bits, (ii) the set of shaping bits for the set of EC bits of the set of transmission bits, and (iii) a subtraction of the set of EC bits from the combination of the set of EC bits with the second set of data bits for the second set of data bits of the set of transmission bits. The network entity 1602 may include a variety of components configured for various functions. In one configuration, the network entity 1602 may include means for processing a set of bits based on a polar code, where the polar code is associated with a pre-transformed polar code, where the set of bits is associated with a mapping, to the polar code, that includes (i) a superset of data bits comprising a set of data bits at a set of frozen bit locations of the polar code and zeros at a set of information bit locations of the polar code and (ii) a set of transformed shaping bits associated with an application of a pre-transform to a set of shaping bits at the set of information bit locations and zeros at the set of frozen bit locations, where the set of transformed shaping bits is super-imposed with the superset of data bits. The network entity 1602 may include a variety of components configured for various functions. In one configuration, the network entity 1602 may include means for communicating, with a second network device, a set of shaped transmission bits associated with the set of bits prior to or subsequent to the set of bits being processed based on the polar code. The means may be the component 199 of the network entity 1602 configured to perform the functions recited by the means. As described supra, the network entity 1602 may include the TX processor 316, the RX processor 370, and the controller/processor 375. As such, in one configuration, the means may be the TX processor 316, the RX processor 370, and/or the controller/processor 375 configured to perform the functions recited by the means.

Communications between network nodes/entities (e.g., base stations, gNBs, etc.) and UEs, or transmitter network devices and receiver network devices, generally, may utilize polar codes for channel polarization of communication payloads. A communication channel may converge to either of a useless or a noiseless channel based on application of a polar transform. Polar code design may include determining which bit locations are allocated to send information bits and which bit locations to send frozen bits. For a polar code, a CRC may be used to improve the decoding performance for channel coding. Dynamic frozen polar codes (also known as pre-transformed polar codes/PC-polar codes are another set of approaches to improve polar code performance for channel coding. However, using CRC-polar does not improve shaping performance, and actually may make the shaping performance worse than a plain/standard polar code. As an example, for shaping, the use of a codeword that yields the best energy savings may be sought, yet there is no "correct" codeword being transmitted. Thus, using a CRC check to select the polar codeword in list decoding does not provide a solution to improve shaping performance. Similarly, a direct application of a PC polar code to the shaping problem does not yield an improvement for shaping performance. As an example, for the channel coding problem, the frozen bits of polar codes can be in principle set to any value as long as the receiver side knows the value or the rules in which these "dynamic" frozen bits are generated. Yet in the context of the shaping problem, the frozen bits may have a correspondence to be the raw data bits to be transmitted in order for the receiver side to recover the data after de-shaping. Therefore, any dynamic frozen/PC bits may be placed into the subset of bit locations that were designed as "information bit locations" for polar codes and not placed into other locations. As a consequence, PC/dynamic frozen polar codes do not provide any additional gain for shaping compared to plain polar codes.

Aspects herein are provided for dynamic frozen polar codes (or EC-polar codes, generally) for probabilistic shaping. Aspects enable maximization of shaping with 2 k codewords (where k is the number of shaping bits) as in other polar code solutions, while providing improved/increased minimum distance between the codewords over other polar code solutions, by mapping bit of a data payload to be transformed by an EC-polar code using a superposition or XOR of a set of data bits of the payload with EC bits where the EC bits are based on the shaping bits for a target distribution of shaped data.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1. A method of wireless communication at a transmitter network device, comprising: mapping a set of transmission bits to an error check polar code (EC-polar code), wherein the set of transmission bits includes a first set of data bits, a second set of data bits, a set of error checking (EC) bits, and a set of shaping bits, wherein: the first set of data bits corresponds to a set of frozen bit locations of the EC-polar code, the set of shaping bits corresponds to a set of information bit locations of the EC-polar code, and the set of EC bits and the second set of data bits both correspond to a set of remaining locations of the EC-polar code; shaping the set of transmission bits to a set of shaped transmission bits based on the mapping, the EC-polar code, and an addition operation on the set of transmission bits including the set of EC bits and the second set of data bits; and transmitting, to a receiver network device, the set of shaped transmission bits.

Aspect 2. The method of aspect 1, wherein shaping the set of transmission bits to the set of shaped transmission bits includes: generating the set of shaping bits based on at least one of a set of log likelihood ratios (LLRs)) or a set of probabilities associated with a target distribution of the set of shaped transmission bits and a decoder of the EC-polar code.

Aspect 3. The method of aspect 2, wherein shaping the set of transmission bits to the set of shaped transmission bits includes: generating the set of EC bits based on an EC relation associated with the set of shaping bits.

Aspect 4. The method of aspect 3, wherein the set of EC bits is a set of cyclic redundancy check (CRC) bits and the EC relation is a CRC relation based on a CRC polynomial and a set of polynomial division remainder values associated with the set of shaping bits.

Aspect 5. The method of aspect 3, wherein the set of EC bits is a set of parity check (PC) bits and the EC relation is a PC relation based on a set of linear combinations of shaping bits in the set of shaping bits.

Aspect 6. The method of aspect 2, wherein the target distribution of the set of shaped transmission bits is associated with a quadrature amplitude modulation (QAM) constellation configuration.

Aspect 7. The method of any of aspects 1 to 6, wherein the EC polar code is a non-binary EC polar code; wherein the EC polar code is a binary EC polar code and the addition operation comprises an exclusive OR (XOR) operation; or wherein shaping the set of transmission bits to the set of shaped transmission bits based on the EC-polar code includes: encoding, to a set of encoded bits, the first set of data bits, the set of shaping bits, the second set of data bits, and the set of EC bits in accordance with the EC-polar code, wherein the set of shaped transmission bits includes the set of encoded bits from an output of the EC polar code for an encoder operation.

Aspect 8. The method of any of aspects 1 to 7, wherein a total set of data bits associated with the set of transmission bits includes the first set of data bits and the second set of data bits; or wherein the EC-polar code is associated with a set of available codewords that includes 2K available codewords, wherein K is a number of shaping bits in the set of shaping bits, and wherein a minimum distance between ones of the set of available codewords is greater than a non-EC polar code.

Aspect 9. A method of wireless communication at a receiver network device, comprising: receiving, from a transmitter network device, a set of shaped transmission bits associated with an error check polar code (EC-polar code); and de-shaping the set of shaped transmission bits to a set of transmission bits based on: (i) an inverse of the EC-polar code for a first set of data bits, a set of shaping bits, and a combination of a set of EC bits with a second set of data bits of the set of transmission bits, (ii) the set of shaping bits for the set of EC bits of the set of transmission bits, and (iii) a subtraction of the set of EC bits from the combination of the set of EC bits with the second set of data bits for the second set of data bits of the set of transmission bits.

Aspect 10. The method of aspect 9, wherein de-shaping the set of shaped transmission bits to the set of transmission bits based on (i) the inverse of the EC-polar code includes: identifying the first set of data bits, the set of shaping bits, and the combination of the set of EC bits with the second set of data bits by an application of the inverse of the EC-polar code to the set of shaped transmission bits.

Aspect 11. The method of aspect 10, wherein de-shaping the set of shaped transmission bits to the set of transmission bits based on (ii) the set of shaping bits for the set of EC bits of the set of transmission bits includes: generating the set of EC bits based on an EC relation associated with the set of shaping bits.

Aspect 12. The method of aspect 11, wherein the set of EC bits is a set of cyclic redundancy check (CRC) bits and the EC relation is a CRC relation based on a CRC polynomial and a set of polynomial division remainder values associated with the set of shaping bits, or wherein the set of EC bits is a set of parity check (PC) bits and the EC relation is a PC relation based on a set of linear combinations of shaping bits in the set of shaping bits.

Aspect 13. The method of any of aspects 9 to 12, wherein the combination of the set of EC bits with the second set of data bits is associated with an addition operation, wherein de-shaping the set of shaped transmission bits to the set of transmission bits based on (iii) a subtraction of the set of EC bits from the combination of the set of EC bits with the second set of data bits includes: subtracting the set of EC bits to the combination of the set of EC bits with the second set of data bits in a bit domain addition operation.

Aspect 14. The method of any of aspects 9 to 13, wherein receiving the set of shaped transmission bits associated with the EC-polar code includes receiving the set of shaped transmission bits based on an output of a channel decoder associated with the receiver network device.

Aspect 15. The method of aspect of any of aspects 9 to 14, wherein de-shaping the set of shaped transmission bits to the set of transmission bits includes de-shaping the set of shaped transmission bits to the set of transmission bits in a bit domain for the set of shaped transmission bits.

Aspect 16. A method of wireless communication at a first network device, comprising: processing a set of bits based on a polar code, wherein the polar code is associated with a pre-transformed polar code, wherein the set of bits is associated with a mapping, to the polar code, that includes (i) a superset of data bits comprising a set of data bits at a set of frozen bit locations of the polar code and zeros at a set of information bit locations of the polar code and (ii) a set of transformed shaping bits associated with an application of a pre-transform matrix to a set of shaping bits at the set of information bit locations and zeros at the set of frozen bit locations; and communicating, with a second network device, a set of shaped transmission bits associated with the set of bits prior to or subsequent to processing the set of bits based on the polar code, where the set of transformed shaping bits is super-imposed with the superset of data bits.

Aspect 17. The method of aspect 16, wherein the first network device is a transmitter network device and the second network device is a receiver network device; wherein processing the set of bits based on the polar code includes shaping the set of data bits to the set of shaped transmission bits based on the mapping and the polar code by: generating the set of shaping bits based on at least one of a set of log likelihood ratios (LLRs) or a set of probabilities associated with a target distribution of the set of shaped transmission bits and a decoder of the polar code; and encoding, to a set of encoded bits, the set of data bits and the set of transformed shaping bits in accordance with the polar code, wherein the set of shaped transmission bits includes the set of encoded bits from an output of the polar code for an encoder operation; wherein communicating the set of shaped transmission bits includes transmitting, to the receiver network device, the set of shaped transmission bits subsequent to processing the set of bits based on the polar code.

Aspect 18. The method of aspect 16, wherein the first network device is a receiver network device and the second network device is a transmitter network device; wherein communicating the set of shaped transmission bits includes receiving, from the transmitter network device, the set of shaped transmission bits prior to processing the set of bits based on the polar code; wherein processing the set of bits based on the polar code includes de-shaping the set of shaped transmission bits to the set of data bits based on the mapping and an inverse of the polar code.

Aspect 19. The method of aspect 18, wherein de-shaping the set of shaped transmission bits to the set of data bits based on the mapping and the inverse of the polar code includes: identifying a transformed shaping bit subset of the set of transformed shaping bits as being zeros based on the transformed shaping bit subset being located before a first shaping bit at a first information bit location of the set of information bit locations; and identifying a bit subset of the superset of data bits based on the inverse of the polar code and the transformed shaping bit subset being zeros.

Aspect 20. The method of aspect 19, wherein the pre-transform matrix is an upper-triangular matrix that includes a set of diagonal elements equal to one, and wherein the polar code is a polarization adjusted convolutional (PAC) code; wherein de-shaping the set of shaped transmission bits to the set of data bits based on the mapping and the inverse of the polar code includes: for each transformed shaping bit of the set of transformed shaping bits after the transformed shaping bit subset: identifying the transformed shaping bit as being zero if the transformed shaping bit is in a frozen bit location of the set of frozen bit locations, and identifying a corresponding bit of the superset of data bits, which corresponds via a first super-position with the transformed shaping bit, based on the inverse of the polar code, a corresponding element of the upper-triangular matrix, and the transformed shaping bit being zero; and for each bit of the superset of data bits after the bit subset: identifying the bit as being zero if the bit is in an information bit location of the set of information bit locations, and identifying a corresponding transformed shaping bit of the set of transformed shaping bits, which corresponds via a second super-position with the bit, based on the inverse of the polar code, the corresponding element of the upper-triangular matrix, and the bit being zero.

Aspect 21 is an apparatus for wireless communication at a transmitter network device, comprising: at least one memory; and at least one processor coupled to the at least one memory, the at least one processor, individually or in any combination, is configured to perform the method of any of aspects 1 to 8.

Aspect 22 is an apparatus for wireless communication at a transmitter network device, comprising means for performing each step in the method of any of aspects 1 to 8.

Aspect 23 is the apparatus of any of aspects 21 and 22, further comprising a transceiver configured to receive or to transmit in association with the method of any of aspects 1 to 8.

Aspect 24 is a computer-readable medium (e.g., a non-transitory computer-readable medium) storing computer executable code at a transmitter network device, the code when executed by at least one processor causes the at least one processor to perform the method of any of aspects 1 to 8.

Aspect 25 is an apparatus for wireless communication at a receiver network device, comprising: at least one memory; and at least one processor coupled to the at least one memory, the at least one processor, individually or in any combination, is configured to perform the method of any of aspects 9 to 15.

Aspect 26 is an apparatus for wireless communication at a receiver network device, comprising means for performing each step in the method of any of aspects 9 to 15.

Aspect 27 is the apparatus of any of aspects 25 and 26, further comprising a transceiver configured to receive or to transmit in association with the method of any of aspects 9 to 15.

Aspect 28 is a computer-readable medium (e.g., a non-transitory computer-readable medium) storing computer executable code at a receiver network device, the code when executed by at least one processor causes the at least one processor to perform the method of any of aspects 9 to 15.

Aspect 29 is an apparatus for wireless communication at a first network device, comprising: at least one memory; and at least one processor coupled to the at least one memory, the at least one processor, individually or in any combination, is configured to perform the method of any of aspects 16 to 20.

Aspect 30 is an apparatus for wireless communication at a first network device, comprising means for performing each step in the method of any of aspects 16 to 20.

Aspect 31 is the apparatus of any of aspects 29 and 30, further comprising a transceiver configured to receive or to transmit in association with the method of any of aspects 16 to 20.

Aspect 32 is a computer-readable medium (e.g., a non-transitory computer-readable medium) storing computer executable code at a first network device, the code when executed by at least one processor causes the at least one processor to perform the method of any of aspects 16 to 20.

What is claimed is:

1. An apparatus for wireless communication at a transmitter network device, comprising:
   at least one memory; and
   at least one processor coupled to the at least one memory and, based at least in part on information stored in the at least one memory, the at least one processor is configured to:

map a set of transmission bits to an error check polar code (EC-polar code), wherein the set of transmission bits includes a first set of data bits, a second set of data bits, a set of error checking (EC) bits, and a set of shaping bits, wherein:
the first set of data bits corresponds to a set of frozen bit locations of the EC-polar code,
the set of shaping bits corresponds to a set of information bit locations of the EC-polar code, and
the set of EC bits and the second set of data bits both correspond to a set of remaining locations of the EC-polar code;
shape the set of transmission bits to a set of shaped transmission bits based on the mapping, the EC-polar code, and an addition operation on the set of transmission bits including the set of EC bits and the second set of data bits; and
transmit, to a receiver network device, the set of shaped transmission bits.

2. The apparatus of claim 1, wherein to shape the set of transmission bits to the set of shaped transmission bits, the at least one processor, individually or in any combination, is configured to:
generate the set of shaping bits based on at least one of a set of log likelihood ratios (LLRs) or a set of probabilities associated with a target distribution of the set of shaped transmission bits and a decoder of the EC-polar code.

3. The apparatus of claim 2, wherein to shape the set of transmission bits to the set of shaped transmission bits, the at least one processor, individually or in any combination, is configured to:
generate the set of EC bits based on an EC relation associated with the set of shaping bits.

4. The apparatus of claim 3, wherein the set of EC bits is a set of cyclic redundancy check (CRC) bits and the EC relation is a CRC relation based on a CRC polynomial and a set of polynomial division remainder values associated with the set of shaping bits.

5. The apparatus of claim 3, wherein the set of EC bits is a set of parity check (PC) bits and the EC relation is a PC relation based on a set of linear combinations of shaping bits in the set of shaping bits.

6. The apparatus of claim 2, wherein the target distribution of the set of shaped transmission bits is associated with a quadrature amplitude modulation (QAM) constellation configuration.

7. The apparatus of claim 1, wherein the EC polar code is a non-binary EC polar code;
wherein the EC polar code is a binary EC polar code and the addition operation comprises an exclusive OR (XOR) operation; or
wherein to shape the set of transmission bits to the set of shaped transmission bits based on the EC-polar code, the at least one processor, individually or in any combination, is configured to:
encode, to a set of encoded bits, the first set of data bits, the set of shaping bits, the second set of data bits, and the set of EC bits in accordance with the EC-polar code, wherein the set of shaped transmission bits includes the set of encoded bits from an output of the EC polar code for an encoder operation.

8. The apparatus of claim 1, wherein a total set of data bits associated with the set of transmission bits includes the first set of data bits and the second set of data bits; or wherein the EC-polar code is associated with a set of available codewords that includes $2^K$ available codewords, wherein K is a number of shaping bits in the set of shaping bits, and
wherein a minimum distance between ones of the set of available codewords is greater than a non-EC polar code.

9. An apparatus for wireless communication at a receiver network device, comprising:
at least one memory; and
at least one processor coupled to the at least one memory and, based at least in part on information stored in the at least one memory, the at least one processor is configured to:
receive, from a transmitter network device, a set of shaped transmission bits associated with an error check polar code (EC-polar code); and
de-shape the set of shaped transmission bits to a set of transmission bits based on:
(i) an inverse of the EC-polar code for a first set of data bits, a set of shaping bits, and a combination of a set of EC bits with a second set of data bits of the set of transmission bits,
(ii) the set of shaping bits for the set of EC bits of the set of transmission bits, and
(iii) a subtraction of the set of EC bits from the combination of the set of EC bits with the second set of data bits for the second set of data bits of the set of transmission bits.

10. The apparatus of claim 9, wherein to de-shape the set of shaped transmission bits to the set of transmission bits based on (i) the inverse of the EC-polar code, the at least one processor, individually or in any combination, is configured to:
identify the first set of data bits, the set of shaping bits, and the combination of the set of EC bits with the second set of data bits by an application of the inverse of the EC-polar code to the set of shaped transmission bits.

11. The apparatus of claim 10, wherein to de-shape the set of shaped transmission bits to the set of transmission bits based on (ii) the set of shaping bits for the set of EC bits of the set of transmission bits, the at least one processor, individually or in any combination, is configured to:
generate the set of EC bits based on an EC relation associated with the set of shaping bits.

12. The apparatus of claim 11, wherein the set of EC bits is a set of cyclic redundancy check (CRC) bits and the EC relation is a CRC relation based on a CRC polynomial and a set of polynomial division remainder values associated with the set of shaping bits, or
wherein the set of EC bits is a set of parity check (PC) bits and the EC relation is a PC relation based on a set of linear combinations of shaping bits in the set of shaping bits.

13. The apparatus of claim 9, wherein the combination of the set of EC bits with the second set of data bits is associated with an addition operation,
wherein to de-shape the set of shaped transmission bits to the set of transmission bits based on (iii) a subtraction of the set of EC bits from the combination of the set of EC bits with the second set of data bits, the at least one processor, individually or in any combination, is configured to:
subtract the set of EC bits to the combination of the set of EC bits with the second set of data bits in a bit domain addition operation.

14. The apparatus of claim 9, wherein to receive the set of shaped transmission bits associated with the EC-polar code, the at least one processor, individually or in any combination, is configured to receive the set of shaped transmission bits based on an output of a channel decoder associated with the receiver network device.

15. The apparatus of claim 9, wherein to de-shape the set of shaped transmission bits to the set of transmission bits, the at least one processor, individually or in any combination, is configured to de-shape the set of shaped transmission bits to the set of transmission bits in a bit domain for the set of shaped transmission bits.

16. An apparatus for wireless communication at a first network device, comprising:
 at least one memory; and
 at least one processor coupled to the at least one memory and, based at least in part on information stored in the at least one memory, the at least one processor is configured to:
 process a set of bits based on a polar code, wherein the polar code is associated with a pre-transformed polar code, wherein the set of bits is associated with a mapping, to the polar code, that includes (i) a superset of data bits comprising a set of data bits at a set of frozen bit locations of the polar code and zeros at a set of information bit locations of the polar code and (ii) a set of transformed shaping bits associated with an application of a pre-transform matrix to a set of shaping bits at the set of information bit locations and zeros at the set of frozen bit locations, wherein the set of transformed shaping bits is super-imposed with the superset of data bits; and
 communicate, with a second network device, a set of shaped transmission bits associated with the set of bits prior to or subsequent to the set of bits being processed based on the polar code.

17. The apparatus of claim 16, wherein the first network device is a transmitter network device and the second network device is a receiver network device;
 wherein to process the set of bits based on the polar code, the at least one processor, individually or in any combination, is configured to shape the set of data bits to the set of shaped transmission bits based on the mapping and the polar code, including to:
 generate the set of shaping bits based on at least one of a set of log likelihood ratios (LLRs) or a set of probabilities associated with a target distribution of the set of shaped transmission bits and a decoder of the polar code; and
 encode, to a set of encoded bits, the set of data bits and the set of transformed shaping bits in accordance with the polar code, wherein the set of shaped transmission bits includes the set of encoded bits from an output of the polar code for an encoder operation;
 wherein to communicate the set of shaped transmission bits, the at least one processor, individually or in any combination, is configured to transmit, to the receiver network device, the set of shaped transmission bits subsequent to the set of bits being processed based on the polar code.

18. The apparatus of claim 16, wherein the first network device is a receiver network device and the second network device is a transmitter network device;
 wherein to communicate the set of shaped transmission bits, the at least one processor, individually or in any combination, is configured to receive, from the transmitter network device, the set of shaped transmission bits prior to processing the set of bits based on the polar code;
 wherein to process the set of bits based on the polar code, the at least one processor, individually or in any combination, is configured to de-shape the set of shaped transmission bits to the set of data bits based on the mapping and an inverse of the polar code.

19. The apparatus of claim 18, wherein the pre-transform matrix is an upper-triangular matrix that includes a set of diagonal elements equal to one, and wherein the polar code is a polarization adjusted convolutional (PAC) code;
 wherein to de-shape the set of shaped transmission bits to the set of data bits based on the mapping and the inverse of the polar code, the at least one processor, individually or in any combination, is configured to:
 identify a transformed shaping bit subset of the set of transformed shaping bits as being zeros based on the transformed shaping bit subset being located before a first shaping bit at a first information bit location of the set of information bit locations; and
 identify a bit subset of the superset of data bits based on the inverse of the polar code and the transformed shaping bit subset being zeros.

20. The apparatus of claim 19, to de-shape the set of shaped transmission bits to the set of data bits based on the mapping and the inverse of the polar code, the at least one processor, individually or in any combination, is configured to:
 for each transformed shaping bit of the set of transformed shaping bits after the transformed shaping bit subset:
 identify the transformed shaping bit as being zero if the transformed shaping bit is in a frozen bit location of the set of frozen bit locations, and
 identify a corresponding bit of the superset of data bits, which corresponds via a first super-position with the transformed shaping bit, based on the inverse of the polar code, a corresponding element of the upper-triangular matrix, and the transformed shaping bit being zero; and
 for each bit of the superset of data bits after the bit subset:
 identify the bit as being zero if the bit is in an information bit location of the set of information bit locations, and
 identify a corresponding transformed shaping bit of the set of transformed shaping bits, which corresponds via a second super-position with the bit, based on the inverse of the polar code, the corresponding element of the upper-triangular matrix, and the bit being zero.

\* \* \* \* \*